(12) United States Patent
Narahara

(10) Patent No.: US 7,257,770 B2
(45) Date of Patent: Aug. 14, 2007

(54) DOCUMENT INFORMATION PROCESSING DEVICE THAT ACHIEVES EFFICIENT UNDERSTANDING OF CONTENTS OF DOCUMENT INFORMATION

(75) Inventor: Kouichi Narahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 475 days.

(21) Appl. No.: 09/900,186

(22) Filed: Jul. 9, 2001

(65) Prior Publication Data

US 2002/0007367 A1 Jan. 17, 2002

(30) Foreign Application Priority Data

Jul. 14, 2000 (JP) .............................. 2000-214394

(51) Int. Cl.
*G06F 15/00* (2006.01)
*G06F 17/00* (2006.01)

(52) U.S. Cl. ...................... 715/513; 715/526; 715/530; 715/531; 382/298; 358/451

(58) Field of Classification Search ................ 715/513, 715/526, 530, 531; 382/298; 358/451
See application file for complete search history.

(56) References Cited

U.S. PATENT DOCUMENTS

| | | | | |
|---|---|---|---|---|
| 5,280,575 | A * | 1/1994 | Young et al. ................ | 715/504 |
| 5,706,452 | A * | 1/1998 | Ivanov ........................ | 345/751 |
| 5,761,395 | A * | 6/1998 | Miyazaki et al. ........... | 358/1.11 |
| 5,924,108 | A * | 7/1999 | Fein et al. ................... | 715/531 |
| 6,029,182 | A * | 2/2000 | Nehab et al. ................ | 715/523 |
| 6,061,700 | A * | 5/2000 | Brobst et al. ................ | 715/517 |
| 6,112,203 | A * | 8/2000 | Bharat et al. ................ | 707/5 |
| 6,154,213 | A * | 11/2000 | Rennison et al. ........... | 345/854 |
| 6,362,894 | B1 * | 3/2002 | Shima ........................ | 358/1.15 |
| 6,370,543 | B2 * | 4/2002 | Hoffert et al. ............. | 707/104.1 |
| 6,460,036 | B1 * | 10/2002 | Herz ........................... | 707/10 |
| 6,584,465 | B1 * | 6/2003 | Zhu et al. .................... | 707/6 |

FOREIGN PATENT DOCUMENTS

| | | | |
|---|---|---|---|
| JP | 07-098708 | | 4/1995 |
| JP | 08-221243 | | 8/1996 |
| JP | 08-255255 | | 10/1996 |
| JP | 08255255 | A * | 10/1996 |
| JP | 11-203100 | | 7/1999 |
| JP | 2000-112967 | | 4/2000 |

OTHER PUBLICATIONS

International Business Machines Corporation, Converting HTML to Well Formed XML With Preference Based Tag Expansion, Jul. 1, 1999, Research Disclosure, vol. 42, issue 423.*

* cited by examiner

*Primary Examiner*—Doug Hutton
*Assistant Examiner*—N Hillery
(74) *Attorney, Agent, or Firm*—Dickstein Shapiro LLP

(57) ABSTRACT

A document-information processing device includes an analysis unit and a process unit. The analysis unit analyzes construction of document information that is composed of a plurality of elements, and evaluates a degree of significance of each element included in the document information. The process unit selects an element sequentially from the plurality of elements, starting from an element whose degree of significance is the highest and ending with an element whose degree of significance is the lowest, and places a selected element on an output document. Alternatively, the process unit reduces an information content of the document information by eliminating or compressing an element whose degree of significance is low.

28 Claims, 17 Drawing Sheets

```
TITLE
TITLE OF FIRST SECTION
   CONTENTS OF FIRST SECTION
   .........

TITLE OF SECOND SECTION
   CONTENTS OF SECOND SECTION
   .........

TITLE OF THIRD SECTION
   CONTENTS OF THIRD SECTION
   .........
```

```
TITLE OF FOURTH SECTION
   CONTENTS OF FOURTH SECTION
   .........

AUGUST 1, 1999
NAME OF AUTHOR

[imagefile.gif]
```

FIG.3

```
1 : <?xml version="1.0" encoding="Shift_JIS"?>
2 :
3 : <!ELEMENT doc (title,main,misc,img)>
4 : <!ELEMENT title (#PCDATA)>
5 : <!ATTLIST title viewpriority CDATA #FIXED "level1">
6 : <!ELEMENT main (section*)>
7 : <!ELEMENT section (sectiontitle,contents)>
8 : <!ELEMENT sectiontitle (#PCDATA)>
9 : <!ATTLIST sectiontitle viewpriority CDATA #FIXED "level2">
10 : <!ELEMENT contents (#PCDATA)>
11 : <!ATTLIST contents viewpriority CDATA #FIXED "level3">
12 : <!ELEMENT misc (date,author)>
13 : <!ATTLIST misc viewpriority CDATA #FIXED "level2">
14 : <!ELEMENT date (#PCDATA)>
15 : <!ELEMENT author (#PCDATA)>
16 : <!ELEMENT img EMPTY>
17 : <!ATTLIST img viewpriority CDATA #FIXED "level3">
18 :
19 : <doc>
20 : <title>TITLE</title>
21 : <main>
22 : <section>
23 : <sectiontitle>TITLE OF FIRST SECTION</sectiontitle>
24 : <contents>CONTENTS OF FIRST SECTION·········</contents>
25 : </section>
26 : <section>
27 : <sectiontitle>TITLE OF SECOND SECTION</sectiontitle>
28 : <contents>CONTENTS OF SECOND SECTION·········</contents>
29 : </section>
30 : <section>
31 : <sectiontitle>TITLE OF THIRD SECTION</sectiontitle>
32 : <contents>CONTENTS OF THIRD SECTION·········</contents>
33 : </section>
34 : <section>
35 : <sectiontitle>TITLE OF FOURTH SECTION</sectiontitle>
36 : <contents>CONTENTS OF FOURTH SECTION·········</contents>
37 : </section>
38 : </main>
39 : <misc>
40 : <date>AUGUST 1,1999</date>
41 : <author>NAME OF AUTHOR</author>
42 : </misc>
43 : <img src="imagefile.gif"></img>
44 : </doc>
```

FIG.4

```
1 : <?xml version="1.0" encoding="Shift_JIS"?>
2 :
3 : <!ELEMENT doc (title,main,misc,img1,img2)>
4 : <!ELEMENT title (#PCDATA)>
5 : <!ATTLIST title viewpriority CDATA #FIXED "level1">
6 : <!ELEMENT main (section*)>
7 : <!ELEMENT section (sectiontitle,contents)>
8 : <!ELEMENT sectiontitle (#PCDATA)>
9 : <!ATTLIST sectiontitle viewpriority CDATA #FIXED "level2">
10 : <!ELEMENT contents (#PCDATA)>
11 : <!ATTLIST contents viewpriority CDATA #FIXED "level3">
12 : <!ELEMENT misc (date,author)>
13 : <!ATTLIST misc viewpriority CDATA #FIXED "level2">
14 : <!ELEMENT date (#PCDATA)>
15 : <!ELEMENT author (#PCDATA)>
16 : <!ELEMENT img1 EMPTY>
17 : <!ATTLIST img1 viewpriority CDATA #FIXED "level3">
18 : <!ELEMENT img2 EMPTY>
19 : <!ATTLIST img2 viewpriorty CDATA #FIXED "level1">>
20 :
21 : <doc>
22 : <title>TITLE</title>
23 : <main>
24 : <section>
25 : <sectiontitle>TITLE OF FIRST SECTION</sectiontitle>
26 : <contents>CONTENTS OF FIRST SECTION………</contents>
27 : </section>
28 : <section>
29 : <sectiontitle>TITLE OF SECOND SECTION</sectiontitle>
30 : <contents>CONTENTS OF SECOND SECTION………</contents>
31 : </section>
32 : </main>
33 : <misc>
34 : <date>AUGUST 1,1999</date>
35 : <author>NAME OF AUTHOR</author>
36 : </misc>
37 : <img1 src="imagefile1.gif"></img1>
38 : <img2 src="imagefile2.gif"></img2>
39 : </doc>
```

FIG.5

TITLE
TITLE OF FIRST SECTION
  CONTENTS OF FIRST SECTION
  .........
TITLE OF SECOND SECTION
  CONTENTS OF SECOND SECTION
  .........
TITLE OF THIRD SECTION
  CONTENTS OF THIRD SECTION
  .........

TITLE OF FOURTH SECTION
  CONTENTS OF FOURTH SECTION
  .........

AUGUST 1, 1999
NAME OF AUTHOR imagefile.gif

FIG.6

TITLE
TITLE OF FIRST SECTION
  CONTENTS OF FIRST SECTION
  .........
TITLE OF SECOND SECTION
  CONTENTS OF SECOND SECTION
  .........

AUGUST 1, 1999

NAME OF AUTHOR imagefile1.gif imagefile2.gif

FIG.15

TITLE
TITLE OF FIRST SECTION
TITLE OF SECOND SECTION

AUGUST 1, 1999
NAME OF AUTHOR imagefile2.gif

DOCUMENT INFORMATION PROCESSING DEVICE THAT ACHIEVES EFFICIENT UNDERSTANDING OF CONTENTS OF DOCUMENT INFORMATION

BACKGROUND OF THE INVENTION

1. Field of the Invention

The present invention relates to a device or a system that processes document information composed of a plurality of elements, for instance, structured-document information described in a structured-document description language such as an HTML (Hypertext Markup Language) or an XML (Extensible Markup Language).

2. Description of the Related Art

Some of WWW (World Wide Web) browser software such as the Netscape Communicator (a registered trademark) of Netscape Communication Co. that is used for reading a document created in an HTML format has a function to download only text information and display the text information almost in an original layout, and to display image information as a small icon instead of downloading the image information and displaying the image information itself, in order to minimize a download time.

Additionally, Japanese Laid-open Patent Application No. 11-203100 discloses a network printer used for minimizing its download time. This network printer downloads only information that is expressed in a specific format inside an HTML document, for example, text information, or image information expressed in a GIF format. On the other hand, the network printer does not download advertisement information, image information whose data size is extremely large, and image information expressed in a format such as a JPEG format, a BMP format or a MPEG format other than the GIF format. Subsequently, the network printer prints out only downloaded information by following an original layout of the downloaded information.

Additionally, the WWW browser software, all kinds of application software such as an editor, and printer-driver software have a function to print a specific page of a document or a part of the specific page by carrying out page specification or area specification.

Document information composed of a plurality of elements is, for example, structured document information described in the HTML, the XML or the like. It is not always desirable to print the entire document information in order to understand contents of the document information. In general, not all of the elements in the document information are important. A degree of significance of each element varies in the document information. Thus, the contents of the document information can be efficiently understood, by printing only an element whose degree of significance is high. Additionally, the number of consumed print sheets for printing the document information can be reduced.

However, an operation is troublesome to display the document information, specify a page including the element whose degree of significance is high or an area including the element, and print the element, by using the WWW browser software or the like. In addition, such an operation does not necessarily achieve efficient understanding of the contents or reduction of the number of the consumed print sheets.

For instance, in a case in which first and fifth pages of document information having five pages include highly significant elements, the number of consumed print sheets can be reduced to two, by specifying and printing only the first and fifth pages, where all the five pages are normally printed. However, in a case in which the highly significant elements are spread throughout all the pages, the above-described page specification cannot achieve reduction of the number of the consumed print sheets. Additionally, if each printed page includes an element whose degree of significance is low in either of the above-described cases, such an element prevents efficient understanding of the contents.

On the other hand, the element whose degree of significance is low is not printed, by specifying and printing only an area that includes the highly significant element, instead of specifying and printing a page including the highly significant element. This area specification gives an advantage to increase efficiency of understanding the contents. However, an operation to specify the area including the highly significant element is troublesome. In addition, by specifying each highly significant element using the area specification in a case in which a plurality of highly significant elements are included in one page, each specified element is individually printed on a single print sheet. Consequently, the number of consumed print sheets possibly increases, despite the purpose of reducing the number.

The above-described network printer hardly achieves efficient understanding of contents of document information or reduction of the number of consumed print sheets. In detail, the network printer is not expected to reduce the number of consumed print sheets, since the network printer dose not download a part of the document information, but prints out the document information in its original format. Additionally, since an information format of an element does not correspond to a degree of significance of the element, the network printer possibly prints an element whose degree of significance is low, or does not possibly print an element whose degree of significance is high.

In a case in which a display device displays the document information, the display device achieves efficient understanding of the contents of the document information by displaying only an element whose degree of significance is high, or, at least, by preferably displaying elements whose degrees of significance are high. However, usage of the above-described WWW browser software such as Netscape Communicator cannot display only the element whose degree of significance is high, and cannot preferably display the elements whose degrees of significance are high.

Transmission of the document information by use of an image transmission device such as a facsimile device is similar to the above-described process to output the document information to a display device or a printer. In detail, the image transmission device preferably outputs or transmits an element whose degree of significance is high among a plurality of elements included in the document information, to a receiving end. Accordingly, the receiving end can save print sheets by printing only the element whose degree of significance is high. In addition, a transmission time to transmit the document information to the receiving end can be reduced.

Document information such as XML document information including an image or a sound tends to have a large information size. Thus, it is often necessary to discard a part of the XML document information before storing or transmitting the XML document information, in order to minimize a storage capacity necessary for storing the XML document information or a transmission time necessary for completing transmission of the XML document information. However, information necessary for understanding contents of the document information should not be lost as a result of discarding the part of the document information.

SUMMARY OF THE INVENTION

Accordingly, it is a general object of the present invention to provide a document-information processing method and a document-information processing device for processing document information composed of a plurality of elements.

A more particular object of the present invention is to provide a document-information processing method and a document-information processing device that achieve efficient understanding of contents of document information composed of a plurality of elements, and reduction of the number of consumed print sheets, if printing the document information.

Another object of the present invention is to provide a document-information processing method and a document-information processing device that achieve efficient understanding of contents of document information composed of a plurality of elements on a screen of a display device.

Yet another object of the present invention is to provide a document-information processing method and a document-information processing device that achieve efficient understanding of contents of document information composed of a plurality of elements, reduction of the number of consumed print sheets, and reduction of a transmission time, if transmitting the document information by using an image transmission device such as a facsimile device.

Yet another object of the present invention is to provide a document-information processing method and a document-information processing device that reduce a total information size of document information composed of a plurality of elements, storing as much necessary information as possible for understanding contents of the document information.

The above-described objects of the present invention are achieved by a method of generating an output document from document information composed of a plurality of elements, the method including the steps of evaluating a degree of significance for each element included in the document information, selecting an element among the plurality of elements in a decreasing significance order, and placing the element on the output document.

The above-described objects of the present invention are also achieved by a method of reducing an information content of document information composed of a plurality of elements, the method including the steps of evaluating a degree of significance for each element included in the document information, and carrying out an operation to the each element, the operation corresponding to the degree of significance of the each element.

The above-described objects of the present invention are also achieved by a document-information processing device, including an input unit inputting document information composed of a plurality of elements from a document information source; an evaluation unit evaluating a degree of significance of each element included in the document information; and a process unit selecting an element among the plurality of elements in a decreasing significance order, and generating an output document, on which a plurality of selected elements are placed in the decreasing significance order.

The above-described objects of the present invention are also achieved by a document-information processing device, including an input unit inputting document information composed of a plurality of elements, from a document information source; an evaluation unit evaluating a degree of significance of each element included in the document information; and a process unit reducing an information content of the document information by carrying out an operation to the each element, the operation corresponding to the degree of significance of the each element.

According to the above-described methods and document-information processing devices, a user can efficiently understand the contents of the document information composed of the plurality of elements, since the plurality of elements are placed on the output document in the decreasing significance order. Additionally, by outputting the output document to a display device, a user can also understand the contents of the document information efficiently on a screen of the display device.

Additionally, operations are carried out to the plurality of elements included in the document information, in accordance with degrees of significance of the plurality of elements. For example, an element having a high degree of significance is stored in a storage device. On the other hand, an element having a low degree of significance is eliminated from the document information or compressed. Accordingly, the above-described methods and information-processing devices can reduce a total information size of the document information, storing as much necessary information as possible for understanding the contents of the document information.

Further, the above-described methods and document-information processing devices can reduce the number of print sheets used for printing the document information, and a transmission time taken for transmitting the document information by using an image transmission device such as a facsimile device, since the total information size of the document information can be reduced.

Other objects, features and advantages of the present invention will become more apparent from the following detailed description when read in conjunction with the accompanying drawings.

BRIEF DESCRIPTION OF THE DRAWINGS

FIG. 3 is a diagram showing an example of structured document information described in an XML;

FIG. 4 is a diagram showing another example of the structured document information described in the XML;

FIG. 5 is a diagram showing an output document obtained by carrying out a normal process on the document information shown in FIG. 3, and fixing the document information by use of an appropriate style sheet;

FIG. 6 is a diagram showing an output document obtained by carrying out the normal process on the document information shown in FIG. 4, and fixing the document information by use of the appropriate style sheet;

FIG. 15 is a diagram showing contents of a document obtained by outputting a result of processing the document information shown in FIG. 4 in the process mode B1;

DESCRIPTION OF THE PREFERRED EMBODIMENTS

A description will now be given of preferred embodiments of the present invention, with reference to the accompanying drawings.

Figure 1:
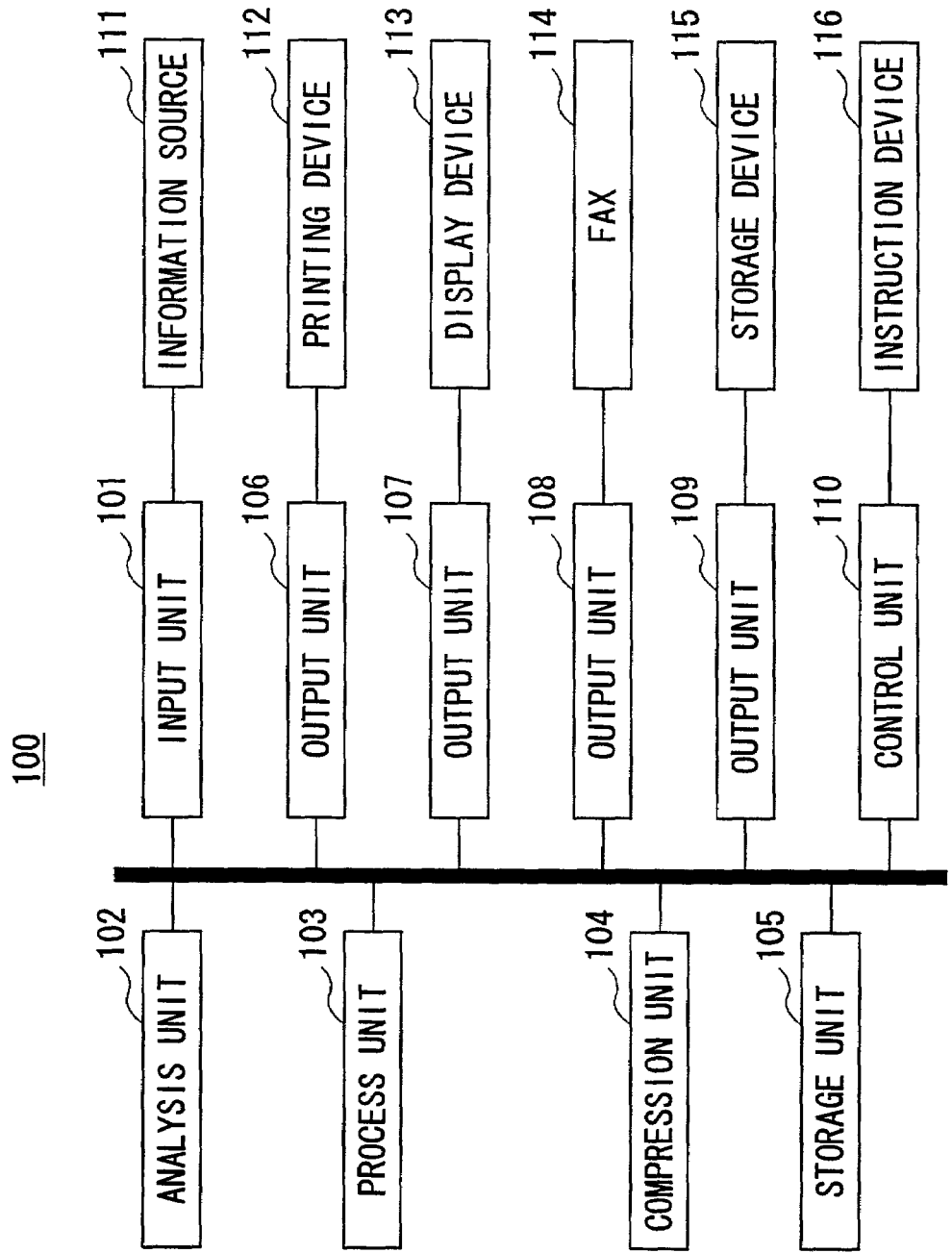
FIG. 1 is a block diagram showing a functional block structure of a document-information processing device according to a first embodiment of the present invention.

FIG. 1 is a block diagram showing a functional block structure of a document-information processing device according to a first embodiment of the present invention. A document-information processing device 100 shown in FIG. 1 includes a document-information input unit (an input unit) 101, a document-information analyzing unit (an analysis unit) 102, a document-information processing unit (a process unit) 103, an information compressing unit (a compression unit) 104, a work-use storage unit (a storage unit) 105, output units 106 through 109, a control unit 110, a document-information source (an information source) 111, a printing device 112, a display device 113, a facsimile device (a FAX) 114, a document-information storing device (a storage device) 115 and a user-instruction device (an instruction device) 116.

The input unit 101 is used for inputting document information composed of a plurality of elements from the information source 111. The document information inputted to the input unit 101 is assumed to be later-described structured document information described in an XML (Extensible Markup Language). The information source 111 is a storage device normally storing the document information. This information source 111 also stores application software such as an XML editor that creates XML document information. The information source 111 and the later-described storage device 115 can be a single storage device.

The analysis unit 102 is means for carrying out syntax analysis or syntax parsing on input document information similarly to a program having been spread as a standard tool called an XML parser, and evaluating a degree of each element in the input document information. The process unit 103 is means for carrying out processes to print the input document information, generate an output document that is to be displayed or transmitted, or reduce an information content of the input document information.

The compression unit 104 is used for compressing static-image information, dynamic-image information or sound information included in the input document information. This compression unit 104 is theoretically included in the process unit 103, but is indicated separately from the process unit 103 since various coding devices are possibly used for information compression.

The storage unit 105 is means for providing a storage area that stores the input document information, and a temporary storage area that stores information related to processes carried out by the analysis unit 102, the process unit 103, the compression unit 104 and the like. The output units 106, 107 and 108 are used for outputting the output document or image data generated by the process unit 103 to the printing device 112, the display device 113 and the FAX 114, respectively. The output unit 109 is used for outputting the input document information whose information content is reduced by the process unit 103, to the storage device 115.

The control unit 110 controls an operation of each of the above-described units 101 through 109, and the entire document-information processing device 100. The instruction device 116 is means for inputting various instructions and output constraint information by a user. The control unit 110 analyzes an instruction or information inputted from the instruction device 116, and stores the instruction or the information in the storage unit 105.

The printing device 112 is not limited to an exclusive printing device such as a printer, and includes a digital copy machine that forms an image from input image data. The display device 113 is not limited to an exclusive image-displaying device such as a display, and includes a device that can display an image based on input image data supplied from a personal computer. Additionally, the FAX 114 includes a personal computer provided with a facsimile card or a facsimile modem, and other image transmission devices.

The document-information processing device 100 can be understood as a single device, or an aggregate of a plurality of devices connected to each other through a network. A description will now be given of the latter case in which the document-information processing device 100 is considered as the aggregate of a plurality of devices, with reference to FIG. 2.

Figure 2:
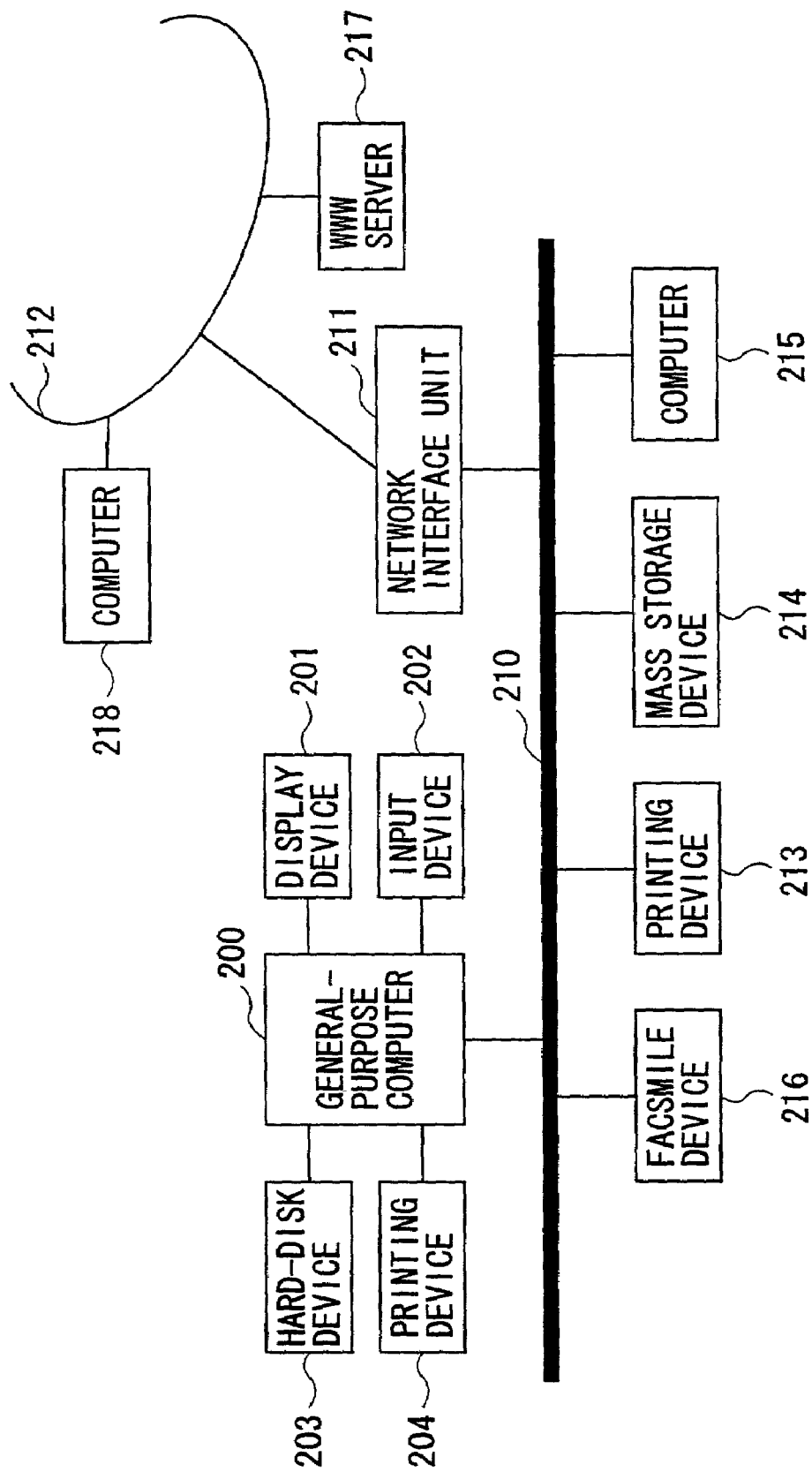
FIG. 2 is a block diagram showing a structure of a document-information processing device according to a second embodiment of the present invention.

FIG. 2 is a block diagram showing a structure of a document-information processing device according to a second embodiment of the present invention. FIG. 2 includes a general-purpose computer (a computer) 200, a display device 201, an input device 202, a hard-disk device 203, a printing device 204, a local-area network (LAN) 210, a network interface unit 211, a network 212, a printing device 213, a mass storage device 214, a computer 215, a facsimile device 216, a WWW server 217 and a computer 218.

The general-purpose computer 200 is a workstation, for example. The input device 202 is a keyboard, a mouse, or the like. The display device 201, the input device 202, the hard-disk device 203 and the printing device 204 are peripheral devices of the general-purpose computer 200. The general-purpose computer or the computer 200 is connected to the printing device 213, the mass storage device 214, the facsimile device 216 and the computer 215 such as a personal computer through the LAN 210. Additionally, the computer 200 is connected to the network 212 such as the Internet or other LANs, through the network interface unit 211 such as a router or a gateway.

For example, the document-information processing device 100 can be achieved by software, utilizing hardware source of the computer 200. The document-information processing device 100 can take a centralized form. In such a centralized document-information processing device 100, the display device 201, the printing device 204, the hard-disk device 203 or an internal memory of the computer 200, the hard-disk device 203, the input device 202 and the a built-in facsimile card of the computer 200 can be used as the display device 113, the printing device 112, the information source 111, the storage device 115, the instruction device 116 and the FAX 114, respectively. The present invention includes a recording medium such as a magnetic disk, an optical disk, a magneto-optical disk or a semiconductor storage device, which stores a program achieving the centralized document-information processing device 100 or its process.

Alternatively, the document-information processing device 100 can take a distributed form. In such a distributed document-information processing device 100, the printing device 213 located on the LAN 210, a display device of the computer 215 located on the LAN 210 or the computer 218 located on the network 212, and an input device of the computer 215 or the computer 218, and the facsimile device 216 located on the LAN 210 can be used as the printing device 112, the display device 113, the instruction device 116 and the FAX 114, respectively. In addition, the mass storage device 214 located on the LAN 210, the WWW server located on the network 212 or a storage device of the computer 218 can be used as the information source 111 or the storage device 115. The present invention includes every type of a recording medium that stores a program achieving the distributed document-information processing device 100 or its process on the computer 200.

As described above, the document-information processing device 100 can take various forms. However, the following description is mainly referred to the document-information processing device 100 shown in FIG. 1.

FIGS. 3 and 4 show examples of document information used for the following description. The examples shown in FIGS. 3 and 4 are structured document information described in the XML, which is a structured-document description language. The document information shown in FIG. 3 includes contents, which are displayed or printed as a 2-page document shown in FIG. 5 by being processed through a normal process and formation using an appropriate style sheet. In addition, the document information shown in FIG. 4 includes contents, which are displayed or printed as a one-page document shown in FIG. 6 by being processes through the normal process and the formation using the appropriate style sheet.

The structured document information described in the XML is composed of three blocks, which are an XML declaration, a document-type declaration and a document entity. For instance, in the document information shown in FIG. 3, a line 1, a line 3 through a line 17, and a line 19 through a line 44 correspond to the XML declaration, the document-type declaration and the document entity, respectively. Additionally, in the document information shown in FIG. 4, a line 1, a line 3 through a line 19, and a line 21 through a line 39 correspond to the XML declaration, the document-type declaration and the document entity, respectively. Line numbers are indicated in the document information shown in FIGS. 3 and 4 for a description purpose, and are not necessarily indicated in the document information, in fact.

The XML declaration specifies that document information is structured document information described in the XML. The document-type declaration is a part describing a document-type definition such as a logical structure of an element or a document included in the document information, and regulates an element name, a parent-child relation between elements, an appearing order of a child element, the number of appearance of the child element and the like. The document entity describes about contents of the document information.

An element composing the document information is marked up with a tag, which is a character string such as "doc", "title" or "main" included in brackets. The tag specifies a meaning of the element, and is individually defined by a creator of the document information in accordance with the contents of the document information.

A logical structure of the document information includes a single highest element called a root. Each element in the structure can be a parent, and can include a child element. In the document information shown in FIG. 3, the tag "doc" corresponds to the root. Tags "title", "main", "misc" and "img" are children of the tag "doc". Accordingly, the document information is called a structured document since the document information has a hierarchical parent-child relation.

The document entity describing about the contents of the document information starts with a start tag indicating a beginning of a root element, and ends with an end tag indicating an end of the root element. Each element included in the document information has a start tag and an end tag, where contents of each element are described between the start tag and the end tag. The start tag and the end tag are described as <tag_name> and </tag_name>, respectively, where the element name defined in the document-type declaration is used for "tag_name". For example, a start tag and an end tag of the tag or the element "doc" are <doc> and </doc>, respectively.

Additionally, the document information shown in FIGS. 3 and 4 describes about information defining a degree of significance for each element included therein. In other words, a significance level (a level 1 through a level 3) is defined as an attribute of an element for each element in the document-type declaration. For example, a significance level of the tag "title" is defined as the level 1, by setting the level 1 to a variable number "viewpriority", as described in the following line included in the document information shown in FIG. 3.

<!ATTLIST title viewpriority CDATA #FIXED "level 1">

The level 1, the level 2 and the level 3 are set values for the variable number "viewpriority", where the level 1 is the highest significance level, and the level 3 is the lowest significance level. Similarly, a significance level is defined for each of tags "sectiontitle", "contents", "misc" and "img". Alternatively, two levels or more than three levels may be set as a significance level, instead of setting the above-described three levels. This significance level is defined as attribute information called "ATTLIST". Alternatively, the significance level can be defined in information "ELEMENT" or "ENTITY".

As described above, a method of describing information that defines a significance level for each element in the document information has an advantage that a creator of the document information can define the significance level of each element in detail and flexibly. Additionally, the document-information processing device 100 can evaluate the significance level of each element, directly from the information that defines the significance level of each element and is described in the document information. However, it is not necessary to describe the significance level for each element in the document information. In a case in which the significance level is not described for each element in the document information, the document-information processing device 100 evaluates the significance level of each element by following a fixed significance-evaluating standard when analyzing the document information.

A description will now be given of a whole process carried out by the document-information processing device 100, with reference to a flowchart shown in FIG. 7.

A user initially instructs document information and a process mode that are objects of a process, through the instruction device 116. In a case in which there are a plurality of the information sources 111, a user selects one of the information sources 111. The process mode is selected among modes A1 through A3 and modes B1 through B5. The process modes A1 through A3 are specified for generating an output document, and supplying the output document to the printing device 112, the display device 113 or the facsimile device 114. The process modes B1 through B5 are specified for reducing an information content of the document information, and outputting the document information to the storage device 115.

In a case in which a user specifies the process modes A1 through A3, the user also specifies a destination of the output document, through the instruction device 116. In addition, if a user specifies the process mode A2 or A3, the user sets output constraint information such as a page size and the number of pages. If a user specifies the process mode A1, the user does not set the output constraint information, and, thus, the document-information uses a default page size. However, a user can specify a page size other than the default page size in the process mode A1. In a case in which a user specifies the process modes B1 through B5, the user inputs a selecting instruction selecting one of the storage devices 115 to the document-information processing device 100 if there exists a plurality of the storage devices 115.

Figure 7:
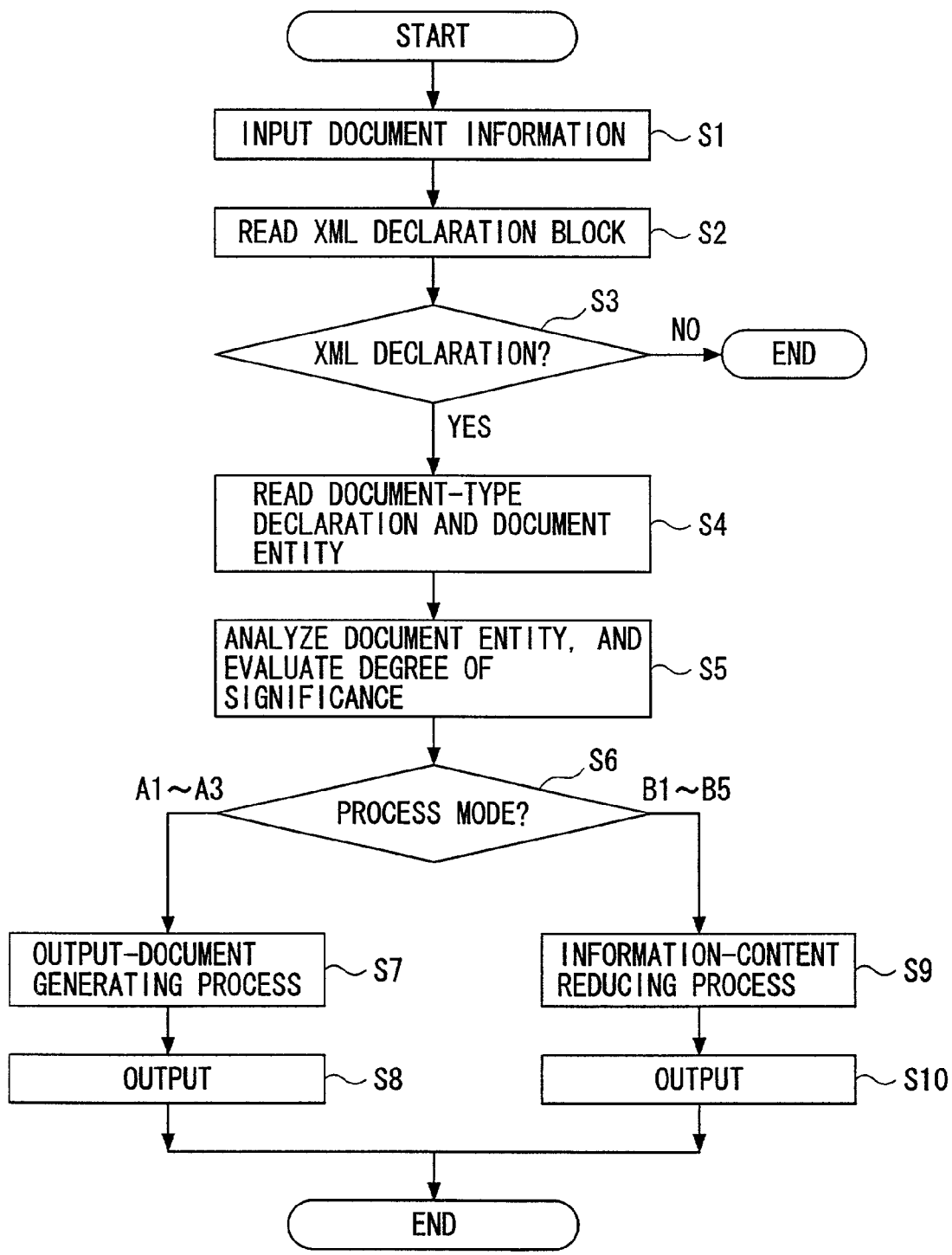
FIG. 7 is a flowchart showing a whole process carried out by the document-information processing device according to the first embodiment.

After a user carries out the above-described instruction operation, and inputs an instruction to start a process to the document-information processing device 100, the document information specified by a user is inputted as input document information, to the input unit 101 of the document-information processing device 100 from the information source 111, at a step S1 shown in FIG. 7. This input document information is stored in the storage unit 105.

Subsequently, the analysis unit 102 reads an XML declaration block of the input document information, at a step S2. The analysis unit 102 determines whether the XML declaration block read at the step S2 is an XML declaration, at a step S3. If it is determined at the step S3 that the XML declaration block is the XML declaration, the analysis unit 102 decides that the input document information is XML document information, and proceeds to a step S4. On the other hand, if it is determined at the step S3 that the XML declaration block is not the XML declaration, the analysis unit 102 decides that the input document information is not an object of the process performed by the document-information processing device 100, and the control unit 110 ends the process.

Figure 8:
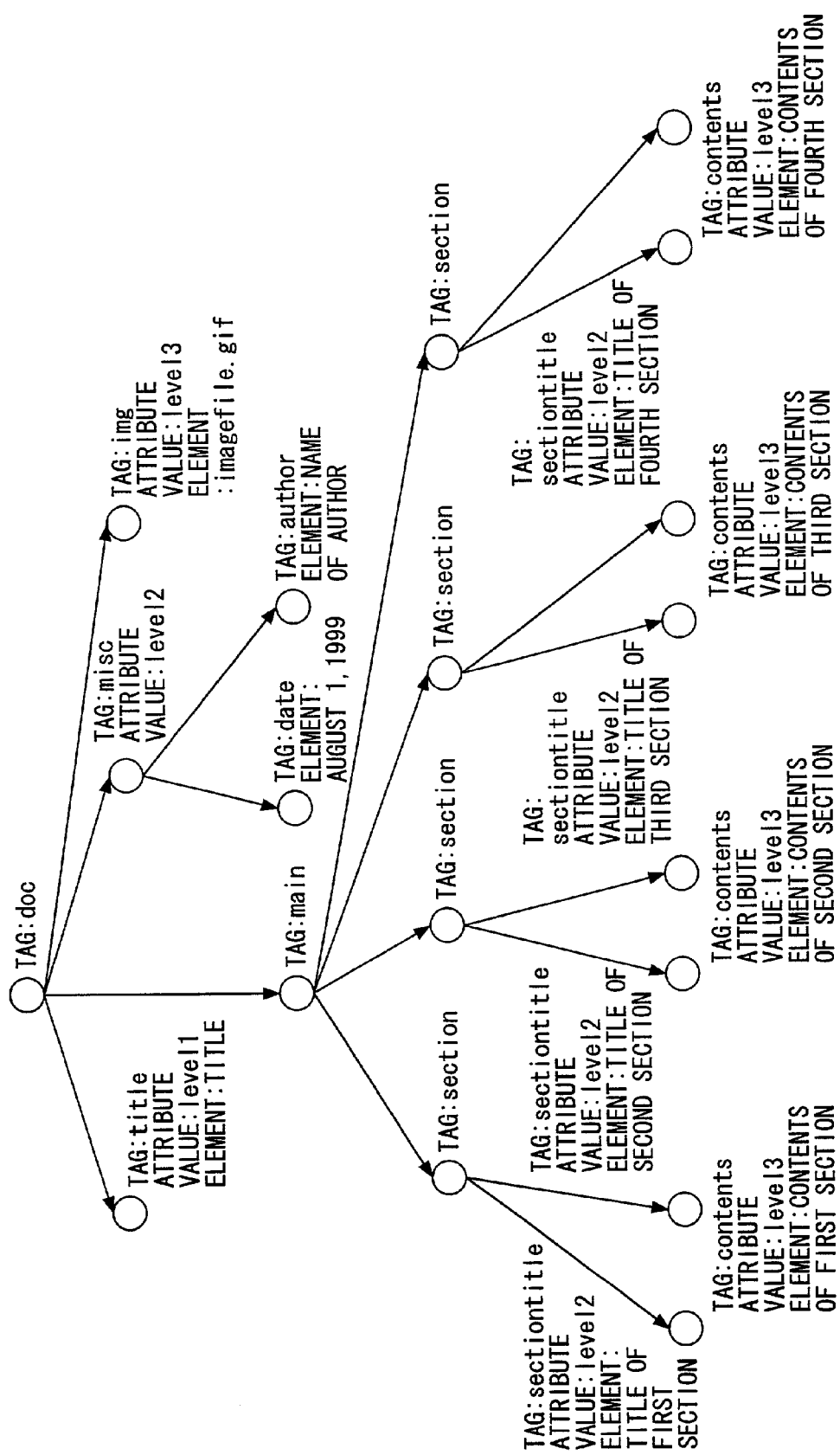
FIG. 8 is a diagram showing a parse tree obtained by analyzing the document information shown in FIG. 3.
Figure 9:
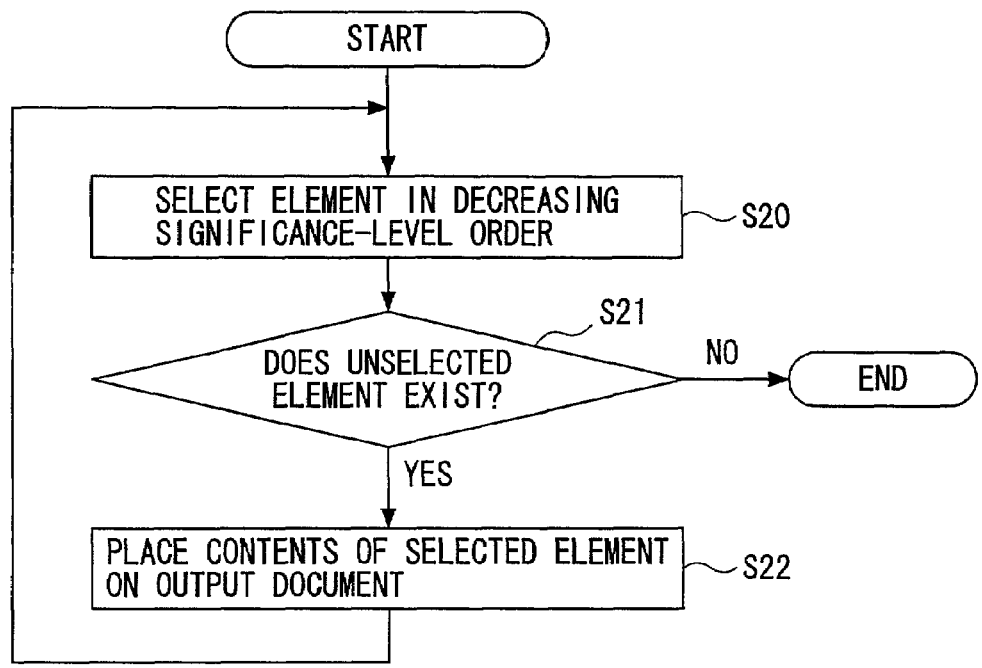
FIG. 9 is a flowchart showing a process carried out by the document-information processing device according to the first embodiment in a process mode A1.

At the step S4, the analysis unit 102 reads a document-type declaration and a document entity of the input document information. Subsequently, the analysis unit 102 separates a tag and an element described in the document entity by using a regulation set in the document-type declaration or a document-type definition, and converts the document entity to a tree structure called a syntax analysis tree or a parse tree, at a step S5. Tree structures related to the document information shown in FIGS. 3 and 4 are shown in FIGS. 8 and 9, respectively. The tree structure converted by the analysis unit 102 is stored in the storage unit 105. The above-described structure analyzing process performed by the analysis unit 102 at the step S5 is the same as an analyzing process performed by the previously-mentioned standard XML parser.

In addition, the analysis unit 102 evaluates the significance level of each element, and adds a result of the evaluation to the parse tree, during the structure analyzing process performed at the step S5. For example, a group of a tag, an attribute and an element is described at each joint of the parse tree, as shown in FIG. 8. Information about a significance level of an element is managed as attribute information of a joint corresponding to the element. For instance, the attribute "viewpriority" indicating the significance level of the tag "title" has the value "level 1".

In the case in which the significance level of each element is described as the attribute information about each element in the document information as shown in FIGS. 3 and 4, the analysis unit 102 evaluates the significance level as a degree of significance of each element. However, in the case in which the information defining the degree of significance for each element is not described in the input document information, the analysis unit 102 evaluates the degree of significance for each element by following the fixed significance-evaluating standard.

According to an example of the significance-evaluating standard, a degree of significance of a text-attribute element is evaluated higher than a degree of significance of a non-text-attribute element such as a static image, a dynamic image or a sound. In addition, the shorter a character length or the number of characters is in an element, the higher evaluation of the element is, among text-attribute elements. This example of the significance-evaluating standard is based on an idea that a text-attribute element is more significant than a non-text-attribute element in general in order to understand contents of document information, and an idea that an element such as a title having a shorter character length has a higher degree of significance. However, the significance-evaluating standard is not limited to the above-described example.

Additionally, another standard can be defined so that a static-image element is evaluated higher than a dynamic-image element or a sound element, among non-text-attribute elements. Further, a plurality of significance-evaluating standards can be initially defined, where a user selects one of the significance-evaluating standards.

After the analysis unit 102 carries out the structure analyzing process and the evaluation of a degree of significance for each element at the step S5, the control unit 110 switches a process flow according to a process mode specified by a user, at a step S6.

In a case in which the process mode A1, A2 or A3 is specified, the control unit 110 instructs the process unit 103 to carry out an output-document (image) generating process for generating an output document, at a step S7. Subsequently, at a step S8, the control unit 110 instructs the process unit 103 to output the output document to a destination specified by a user through the output units 106, 107 or 108, and, then, finishes the above-described process. In a case in which the FAX 114 is specified as the destination, a facsimile number of a receiving end is also specified by a user in advance.

On the other hand, in a case in which one of the process modes B1 through B5 is specified, the control unit 110 instructs the process unit 103 to carry out an information-content reducing process for reducing the information content of the input document information, at a step S9. Subsequently, the control unit 110 instructs the process unit 103 to output the input document information or the structured document information whose information content is reduced, to the storage device 115 specified by a user through the output unit 109, at step S10, and, then, finishes the above-described process. In a case in which image information or the like needs to be compressed during the above-described information-content reducing process, the compression unit 104 compresses the image information or the like.

A description will now be given of a process (S7 or S9) carried out by the process unit 103 in each process mode.

First, a description will be given of a process carried out by the process unit 103 in the process mode A1, with reference to a flowchart shown in FIG. 9. It is assumed that the document information shown in FIG. 3 is inputted as input document information to the document-information processing device 100.

At a step S20, the process unit 103 selects an element whose degree of significance is the highest among unselected elements included in the parse tree shown in FIG. 8, by tracing the entire parse tree from left to right, starting from the root tag "doc" and taking a depth of the element as a priority. If the process unit 103 decides at a step S21 that no unselected element exists in the parse tree, the process unit 103 finishes the process.

In this example, the first element selected by the process unit 103 is an element "TITLE" whose significance level is the level 1, which is the highest level. Thus, the process unit 103 places contents of the element "TITLE", that is, a character string "TITLE", at the beginning of the first page of an output document initially prepared in the storage unit 105, at a step S22. This output document initially contains no information. Additionally, the process unit 103 adds flag information indicating that an element has been selected, to the element "TITLE" in the parse tree, at the step S22.

Similarly, the process unit 103 traces the parse tree, but cannot detect an unselected element whose significance level is the level 1. Accordingly, the process unit 103 selects an element "TITLE OF FIRST SECTION" whose significance level is the level 2, which is the second highest level. Subsequently, the process unit 103 places contents of the element "TITLE OF FIRST SECTION", that is, a character string "TITLE OF FIRST SECTION", after the character string "TITLE" on the output document. Additionally, the process unit 103 adds the flag information indicating that an element has been selected, to the element "TITLE OF FIRST SECTION".

Similarly, the process unit 103 selects an element "TITLE OF SECOND SECTION" whose significance level is the level 2, and places contents of the element "TITLE OF SECOND SECTION", that is, a character string "TITLE OF SECOND SECTION", after the character string "TITLE OF FIRST SECTION".

As described above, the process unit 103 selects elements in the parse tree sequentially, in a decreasing significance-level order, and places contents of the elements on the output document. At last, the process unit 103 selects an element "imagefile.gif", and places contents of the element "imagefile.gif", that is, image information, on the output document. Consequently, the process unit 103 cannot detect any more unselected elements at the step S21, and, thus, finishes the process. It should be noted that the significance level "level 2" described as an attribute value of the tag "misc" is set to significance levels of an element "Aug. 1, 1999" and an element "NAME OF AUTHOR".

In the above-described process mode A1, the process unit 103 selects an element, and places the selected element on the output document, one by one. Alternatively, the process unit 103 can separate an element selecting process to select an element, and an element placing process to place the element on the output document, and, thus, can place elements on the output document in an element selecting order after completing selection of all the elements. For instance, the process unit 103 adds flag information indicating a selecting order of an element selected from the parse tree to the element, to each element, so that the process unit 103 can recognize the element selecting order during the element placing process. A method and an apparatus achieving the above-described modification of the element selecting process and the element placing process are also included in the present invention.

Figure 10:
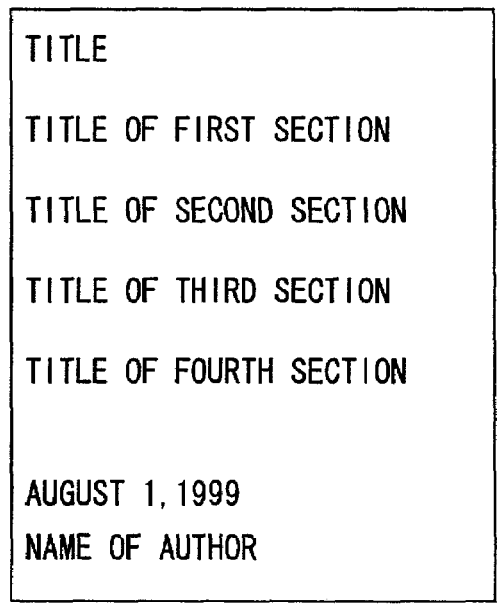
FIG. 10 is a diagram showing contents of a first page of an output document generated from the document information shown in FIG. 3 in the process mode A1.

The process unit 103 generates the output document, on which elements are placed in the decreasing significance-level order, as described above. In a case in which the printing device 112 prints out all the pages of the output document supplied from the process unit 103, a user cannot expect to save the number of print sheets consumed for printing the output document. However, a user can confirm contents of the input document information just by looking over the first page of the output document, since the first page includes elements whose degrees of significance is high, as shown in FIG. 10. In a case in which a user cannot understand the contents of the input document information just by looking over the first page, the user looks over pages following the first page. Even in such a case, the user can understand the contents efficiently, since the pages following the first page include elements sequentially from an element whose degree of significance is high to an element whose degree of significance is low. Alternatively, the printing device 112 can print only the first page according to page specification instructed by a user, thereby reducing the number of print sheets consumed for printing the output document.

In a case in which the FAX 114 carries out facsimile transmission of the output document supplied from the process unit 103, a user can expect an effect similar to the above on a receiving end. Additionally, in a case in which the display device 113 displays the output document supplied from the process unit 103, the display device 113 displays elements sequentially from an element whose degree of significance is high to an element whose degree of significance is low. Accordingly, a user can confirm the contents of the input document information speedily without scrolling to the last page of the output document.

Next, a description will be given of a process carried out by the document-information processing device 100 in the process mode A2, with reference to a flowchart shown in FIG. 11. It is assumed that the document information shown in FIG. 3 is inputted as input document information to the document-information processing device 100.

At a step S30, the process unit 103 selects an element whose degree of significance is the highest among unselected elements included in the parse tree shown in FIG. 8, by tracing the entire parse tree from left to right, starting from the root tag "doc" and taking a depth of the element as a priority. If the process unit 103 decides at a step S31 that no unselected element exists in the parse tree, the process unit 103 proceeds to a step S36.

In this example, the first element selected by the process unit 103 is the element "TITLE" whose significance level is the level 1, which is the highest level. Thus, the process unit 103 adds flag information indicating that an element has been selected, and a selecting order of the element is one, to the element "TITLE".

After selecting an element, the process unit 103 calculates a size of a space (an occupation space) to be occupied by the selected element on an output document in a case in which the process unit 103 places the selected element on the output document, at a step S32. Subsequently, the process unit 103 adds the size of the occupation space calculated at the step S32 to a size of a total occupation space to be occupied by elements having been selected, at a step S33. At a step S34, the process unit 103 compares a size of the total occupation space obtained at the step S33, with a space limit determined based on a page size and the number of pages of the output document, which are specified by the output constraint information.

If it is determined at the step S34 that the size of the total occupation space is less than or equal to the space limit, the process unit 103 proceeds to the step S30, and repeats the steps S30 through S34. On the other hand, if it is determined at the step S34 that the size of the total occupation space is larger than the space limit, the process unit 103 changes the flag information of an element selected most recently by the process unit 103 to flag information indicating that the element is unselected, thereby discarding the element from a group of selected elements, at a step S35. In other words, the element selected most recently by the process unit 103 is eliminated from the output document.

Subsequently, at the step S36, the process unit 103 selects each element among elements that are selected at the steps S30 through S35, in an increasing selecting order by referring to the parse tree, and places contents of the element on the output document prepared in the storage unit 105, starting from the beginning of the first page of the output document. As a result, the process unit 103 generates the output document, on which the elements are placed sequentially, from an element whose degree of significance is high to an element whose degree of significance is low.

In a case in which all the elements included in the input document information are selected before the total occupation space exceeds the space limit, the process unit 103 proceeds to the step S36 immediately. Consequently, all the elements are placed on the output document in the increasing selecting order.

The process unit 103 may take an alternative process. In detail, the process unit 103 may actually place the selected element on the output document, at the step S32, and may eliminate an element most recently placed on the output document from the output document, at the step S35. Consequently, the step S36 becomes unnecessary. A method and an apparatus achieving the above-described alternative process are included in the present invention.

If the page size of the output document and the number of pages included in the output document are specified to an A4 size and one page respectively in the output constraint information, the document-information processing device generates a one-page output document whose contents are shown in FIG. 10. By outputting the one-page output document from the process unit 103 to the printing device 112, and printing the one-page output document from the printing device 112, the document-information processing device 100 achieves efficient understanding of the contents of the input document information. In addition, the document-information processing device 100 can reduce the number of print sheets consumed for printing the output document, compared to a case in which the document-information processing device 100 prints the output document as it is.

In a case in which the document-information processing device 100 supplies the output document from the process unit 103 to the FAX 114, and transmits the output document by using the FAX 114, the document-information processing device 100 can achieve efficient understanding of the contents of the document information and reduction of the number of print sheets consumed for printing the output document on a receiving end. Further, the document-information processing device 100 can shorten a facsimile transmission time taken for transmitting the output document to the receiving end.

Additionally, in a case in which the document-information processing device 100 supplies the output document from the process unit 103 to the display device 113, and displays the output document on the display device 113, a user can confirm the contents of the document information speedily without scrolling a screen of the display device 113 often. Further, in a case in which the document-information processing device 100 transmits the output document to the printing device 112, the display device 113 or the FAX 114 through a network, the document-information processing device 100 can shorten a transmission time to transmit the output document thereto.

Next, a description will be given of a process carried out by the document-information processing device 100 in the process mode A3, with reference to a flowchart shown in FIG. 12. It is assumed that the document information shown in FIG. 3 is inputted as input document information to the document-information processing device 100 in the process mode A3.

Figure 11:
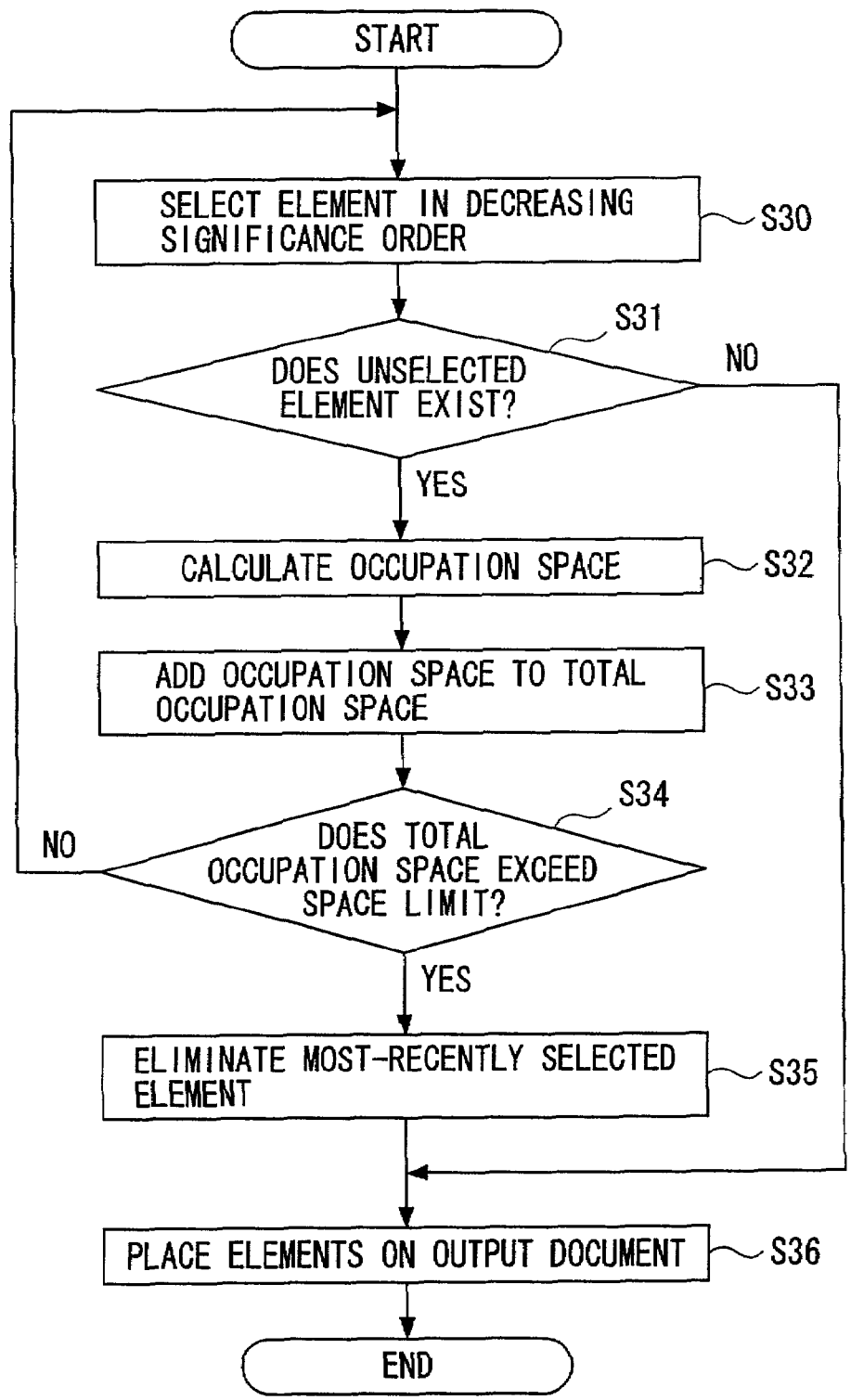
FIG. 11 is a flowchart showing a process carried out by the document-information processing device according to the first embodiment in a process mode A2.
Figure 12:
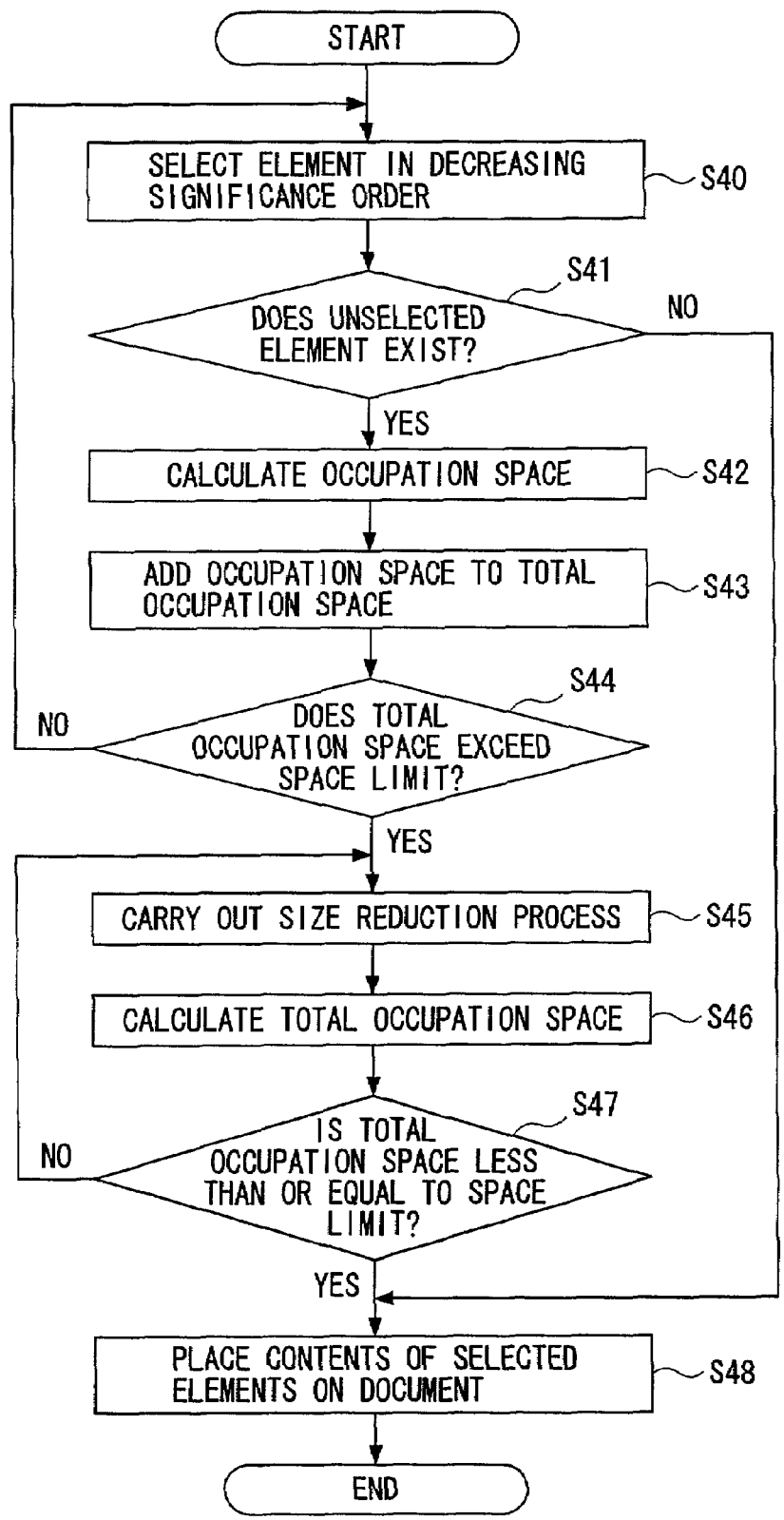
FIG. 12 is a flowchart showing a process carried out by the document-information processing device according to the first embodiment in a process mode A3.

Steps S40 through S44 shown in FIG. 12 are the same as the steps S30 through S34 shown in FIG. 11. In detail, at the step S40, the process unit 103 selects an element whose degree of significance is the highest among unselected elements included in the parse tree shown in FIG. 8, by tracing the entire parse tree from left to right, starting from the root tag "doc" and taking a depth of the element as a priority. Then, the process unit 103 adds flag information indicating that an element has been selected, and a selecting order of the element, to the element selected at the step S40.

If the process unit 103 decides at the step S41 that no unselected element exists in the parse tree, the process unit 103 proceeds to a step S48.

After selecting the element, the process unit 103 calculates a size of an occupation space to be occupied by the selected element on an output document in a case in which the process unit 103 places the selected element on the output document, at the step S42. Subsequently, the process unit 103 adds the size of the occupation space calculated at the step S42 to a size of a total occupation space to be occupied by elements having been selected, at the step S43. At the step S44, the process unit 103 compares a size of the total occupation space obtained at the step S43, with a space limit determined based on a page size and the number of pages of the output document, which are specified by the output constraint information. If it is determined at the step S44 that the size of the total occupation space is less than or equal to the space limit, the process unit 103 proceeds to the step S40, and repeats the steps S40 through S44.

On the other hand, if it is determined at the step S44 that the size of the total occupation space is larger than the space limit, the process unit 103 proceeds to a step S45, and carries out a size reduction process to reduce a size of a selected element. This size reduction process can be performed to all the selected elements, or a part of the selected elements such as an element or a plurality of elements that are most recently selected by the process unit 103. Generally, the process unit 103 has more advantage for reducing its processing load, by carrying out the size reduction process to the part of the selected elements, compared to execution of the size reduction process to all the selected elements. Additionally, a user may select an object area for the size reduction process. For example, the process unit 103 reduces a size of a text element, by reducing its font size by one point. The process unit 103 reduces a size of an image element, by adjusting resolution of the image element. For example, the process unit 103 adjusts the resolution of the image element so that the size of the image element is reduced by 10%.

Subsequently, at a step S46, the process unit 103 calculates a size of a total occupation space processed through the size reduction process. Additionally, the process unit 103 compares the size of the total occupation space calculated at the step S46, with the space limit, at a step S47. If it is determined at the step S47 that the size of the total occupation space is still larger than the space limit, the process unit 103 proceeds to the step S45, and further reduces the size of the total occupation space. Subsequently, the process unit 103 executes the steps S46 and S47. The process unit 103 repeats the steps S45 through S47 until it is determined at the step S47 that the size of the total occupation space is less than or equal to the space limit.

If it is determined at the step S47 that the size of the total occupation space is reduced less than or equal to the space limit, the process unit 103 places contents of all the selected elements on the output document in an increasing selecting order, at the step S48. At the step S48, an element or a plurality of elements, that are, objects of the size reduction process, are placed on the output document in a reduced font size or a reduced image size. According to the process mode A3, the process unit 103 can output an extra element on the output document having the same page size and the same number of pages as the output document created in the process mode A2, compared to the process mode A2.

If the process unit 103 cannot find any unselected elements before the size of the total occupation space exceeds the space limit at the step S41, the process unit 103 skips the steps S45 through S47, and places all the elements on the output document in their original sizes and a decreasing significance order.

Additionally, in an alternative process, the process unit 103 may place the element selected at the step S40 on the output document, at the step S42, and may replace the element placed on the output document at the step S42 with the element whose size is reduced, at the step S46. In this case, the step S48 becomes unnecessary. A method and an apparatus achieving the above-described process are also included in the present invention.

In a case in which the document-information processing device 100 outputs the output document to the printing device 112, the FAX 114 or the like in the process mode A3, the document-information processing device 100 can achieve efficient confirmation of contents of document information, and reduction of the number of print sheets or recording sheets consumed for printing the document information. Additionally, the document-information processing device 100 can reduce a time taken for outputting the document information, and a facsimile transmission time of the document information. Further, the document-information processing device 100 can achieve fast confirmation of the contents of the document information, by outputting the output document to the display device 113, and displaying the output document thereon.

Figure 13:
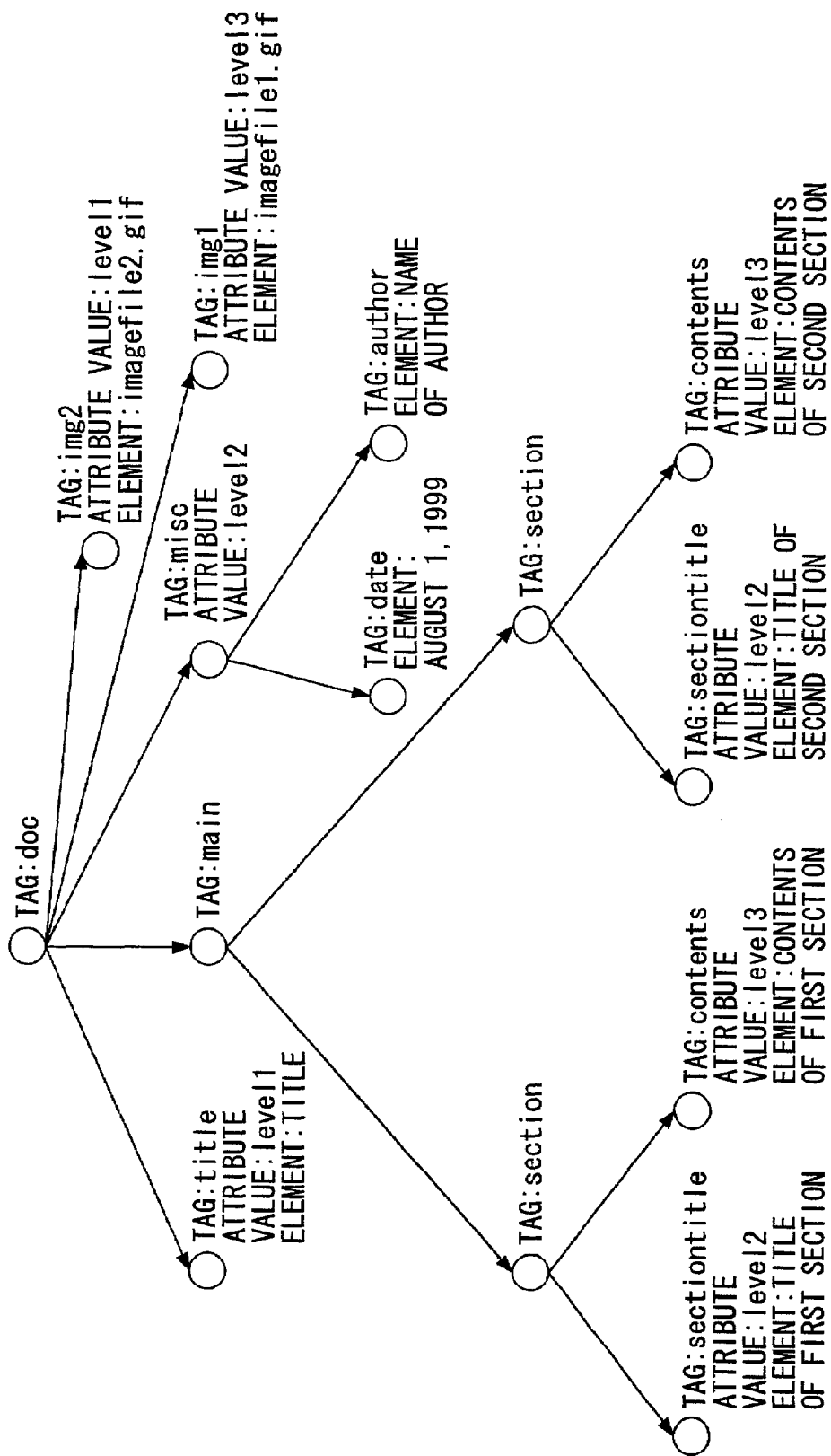
FIG. 13 is a diagram showing a parse tree obtained by analyzing the document information shown in FIG. 4.
Figure 14:
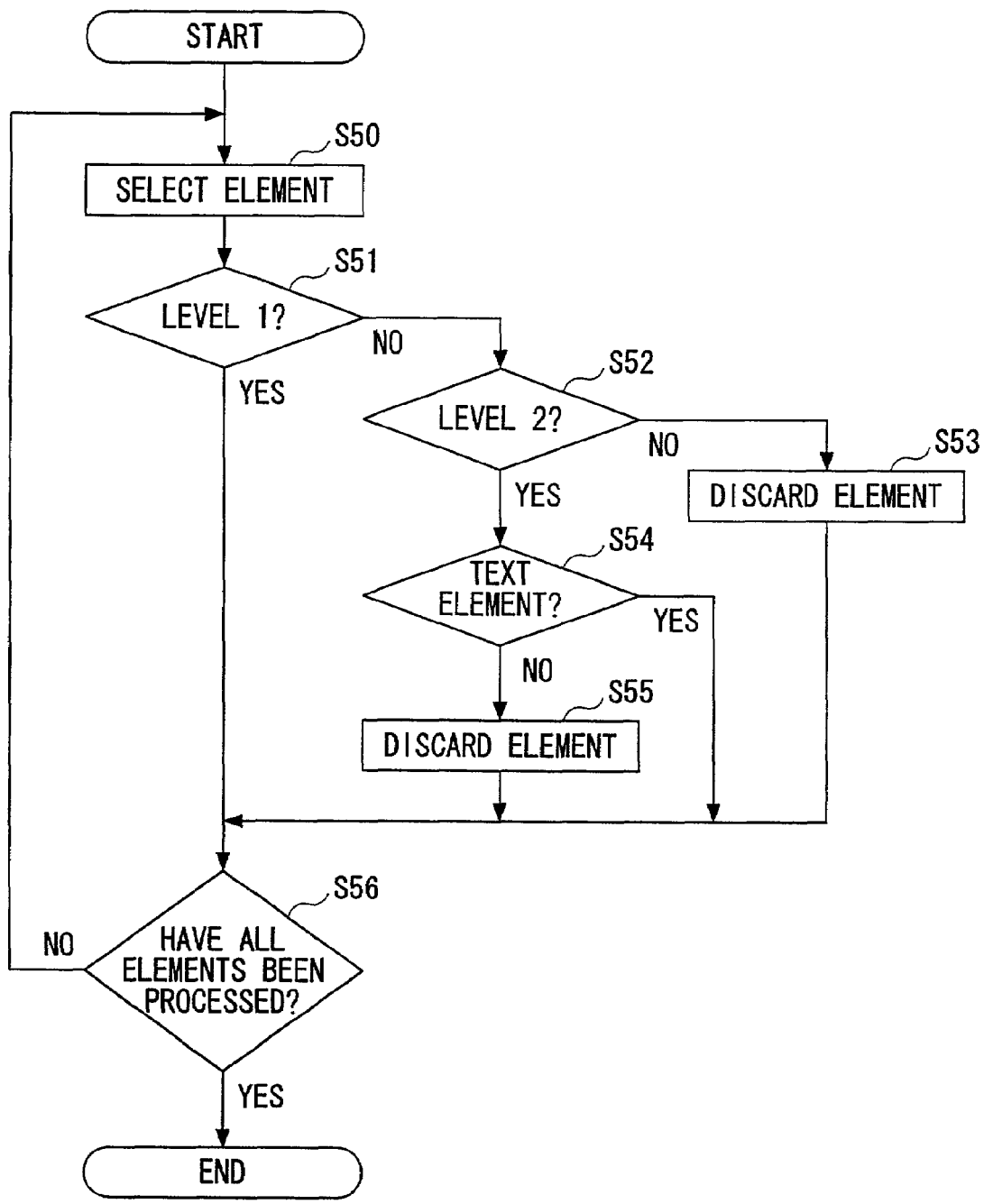
FIG. 14 is a flowchart showing a process carried out by the document-information processing device according to the first embodiment in a process mode B1.

Next, a description will be given of a process carried out by the document-information processing device 100 in the process mode B1, with reference to a flowchart shown in FIG. 14. It is assumed that the document information shown in FIG. 4 is inputted as input document information to the document-information processing device 100 in the process mode B1. FIG. 13 is a diagram showing a parse tree obtained by analyzing the document information shown in FIG. 4.

At a step S50, the process unit 103 selects an element sequentially from the document information, starting from the tag "doc", by tracking the parse tree shown in FIG. 13 once from left to right, and taking a depth of an element as a priority. Subsequently, at a step S51, the process unit 103 checks whether a significance level of the element selected at the step S50 is the highest level, which is, the level 1. If it is determined at the step S51 that the significance level of the element selected at the step S50 is the level 1, the process unit 103 keeps the element without checking whether the element is a text element or a non-text element.

On the other hand, if it is determined at the step S51 that the significance level of the element selected at the step S50 is not the level 1, the process unit 103 checks whether the significance level of the element is the level 2, at a step S52. If it is determined at the step S52 that the significance level of the element is not the level 2, the process unit 103 determines that the significance level of the element is the level 3, that is, the lowest level among all the significance levels included in the parse tree shown in FIG. 13, and, discards the element, at a step S53.

If it is determined at the step S52 that the significance level of the element is the level 2, the process unit 103 proceeds to a step S54, and checks whether the element is a text element. If it is determined at the step S54 that the element is the text element, the process unit 103 keeps the element. On the other hand, if it is determined at the step S54 that the element is a non-text element such as an image, the process unit discards the element, at a step S55. The process unit 103 repeats the above-described steps S50 through S55 for each element in the document information. If the process unit 103 determines at a step S56 that the process unit 103 has processed all the elements included in the document information, the process unit 103 finishes the above-described process in the process mode B1.

As described above, regarding a text element whose degree of significance is generally high for understanding contents of document information, the document-information processing device 100 keeps one or a plurality of text elements whose significance levels are higher than or equal to the level 2, and discards one or a plurality of text elements whose significance levels are lower than the level 2, in the process mode B1. Additionally, the document-information processing device 100 keeps one or a plurality of non-text elements whose significance levels are the level 1, which is generally lower than a degree of significance of a text element, and discards one or a plurality of non-text elements whose significance levels are lower than the level 1. Accordingly, the document-information processing device 100 can store as much necessary information as possible for understanding the contents of the document information, and can reduce a total quantity of the information.

FIG. 15 is a diagram showing contents of a document obtained by outputting a result of processing the document information shown in FIG. 4 in the process mode B1. Significance levels of a tag "img1" and tags "contents" are the level 3, as shown in FIGS. 4 and 13, and, thus, elements of the tag "img1" and the tags "contents" are eliminated from the document shown in FIG. 15.

Accordingly, the document-information processing device 100 can reduce a storage capacity necessary for storing the document information, by storing the document information whose information content is reduced as described above, in the storage device 115, compared to a case in which the document-information processing device 100 stores original document information in the storage device 115. Additionally, in a case in which the storage device 115 is connected to the document-information processing device 100 through a network, the document-information processing device 100 can reduce a transmission time taken for transmitting the document information to the storage device 115.

Additionally, since the document information stored in the storage device 115 holds information necessary for confirming the contents of the original document information, the document-information processing device 100 can achieve confirmation of the contents of the original document information without difficulty, by printing or displaying the document information stored in the storage device 115. Further, document-information processing device 100 can achieve efficient confirmation of the contents of the original document information, since the document information stored in the storage device 115 does not include an element whose degree of significance is low in the original document information.

Figure 16:
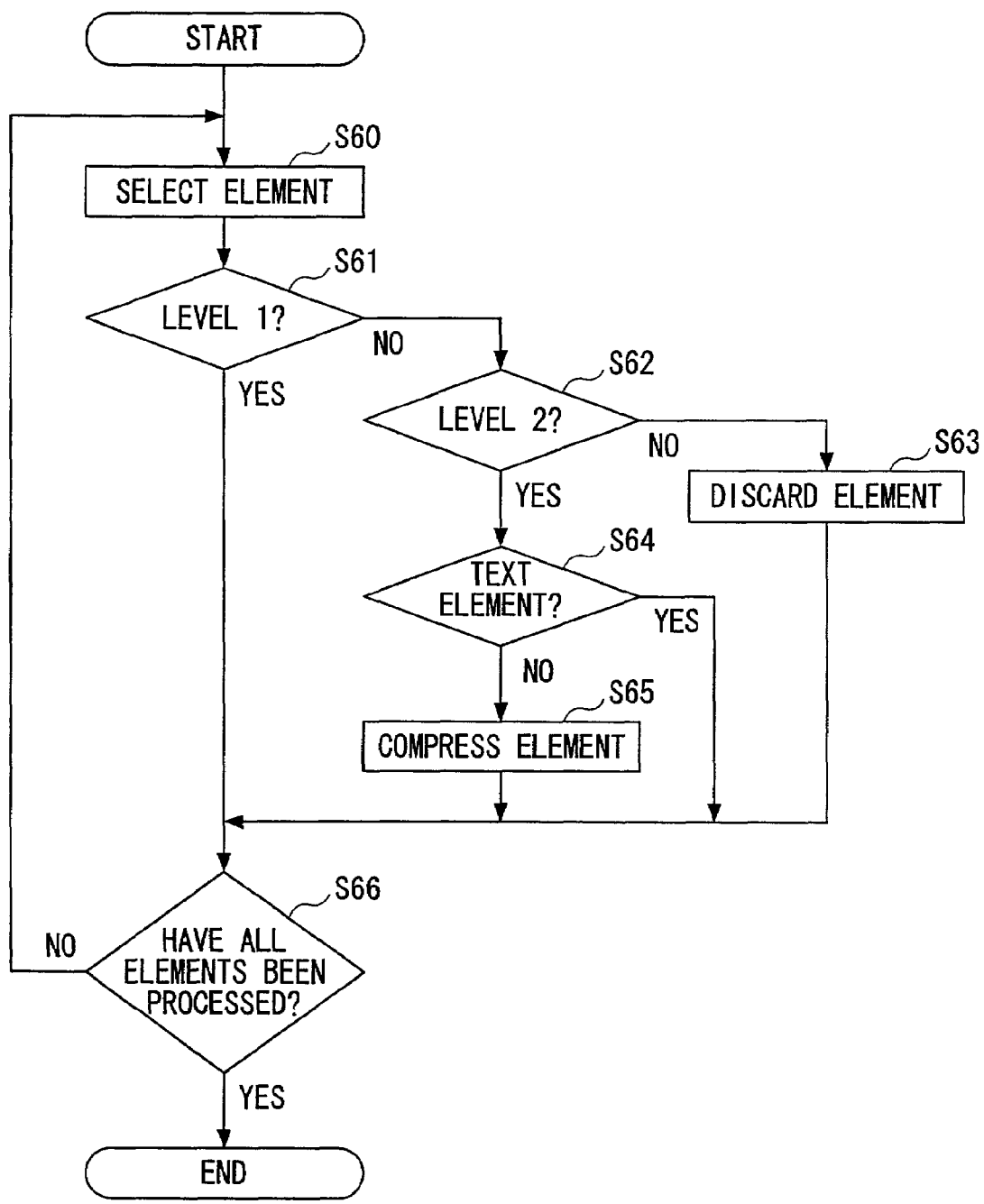
FIG. 16 is a flowchart showing a process carried out by the document-information processing device according to the first embodiment in a process mode B2.

Next, a description will be given of a process carried out by the document-information processing device 100 in the process mode B2, with reference to a flowchart shown in FIG. 16. A difference between the process modes B1 and B2 is that the step S55 of the process mode B1 for discarding an element is replaced with a step S65 for compressing the element in the process mode B2. The other steps S60 through S64 and S66 shown in FIG. 16 are the same as the steps S50 thorough S54 and S56 shown in FIG. 14, respectively.

In detail, a non-text element whose significance level is the level 2 is discarded at the step S55 in the process mode B1, but is compressed by the compression unit 104 at the step S65 in the process mode B2. The compression unit 104 can use a well-known compression method such as discrete cosine transform or Huffman coding, for compressing a static image, at the step S65. A document related to such a well-known compression method is "Nelson, M. 1994. Data compression handbook, Toppan, Japan", for example. Additionally, the compression unit 104 can use an MPEG (Moving Picture Experts Group) compression method for compressing a dynamic image, and can use an MP3 (MPEG1 Audio Layer 3) compression method for compressing sound data, at the step S65. Further, the compression unit 104 can compress an information content of the static image or the dynamic image, by reducing a size of the image, lowering resolution of the image, or expanding a quantization interval on the image.

As described above, the document-information processing device 100 keeps one or a plurality of non-text elements such as images or sounds whose significance levels are the level 1 as they are, and stores one or a plurality of non-text elements whose significance levels are the level 2 after compressing the one or the plurality of non-text elements, in the process mode B2. Additionally, regarding a text element whose degree of significance is generally high for understanding contents of document information, the document-information processing device 100 keeps one or a plurality of text elements whose significance levels are higher than or equal to the level 2, and discards one or a plurality of text elements whose significance levels are lower than the level 2, similarly to the process mode B1.

Next, a description will be given of a process carried out by the document-information processing device 100 in the process mode B3, with reference to a flowchart shown in FIG. 17. It should be noted that the document information shown in FIG. 4 is inputted as input document information to the document-information processing device 100 in the process mode B3.

Figure 17:
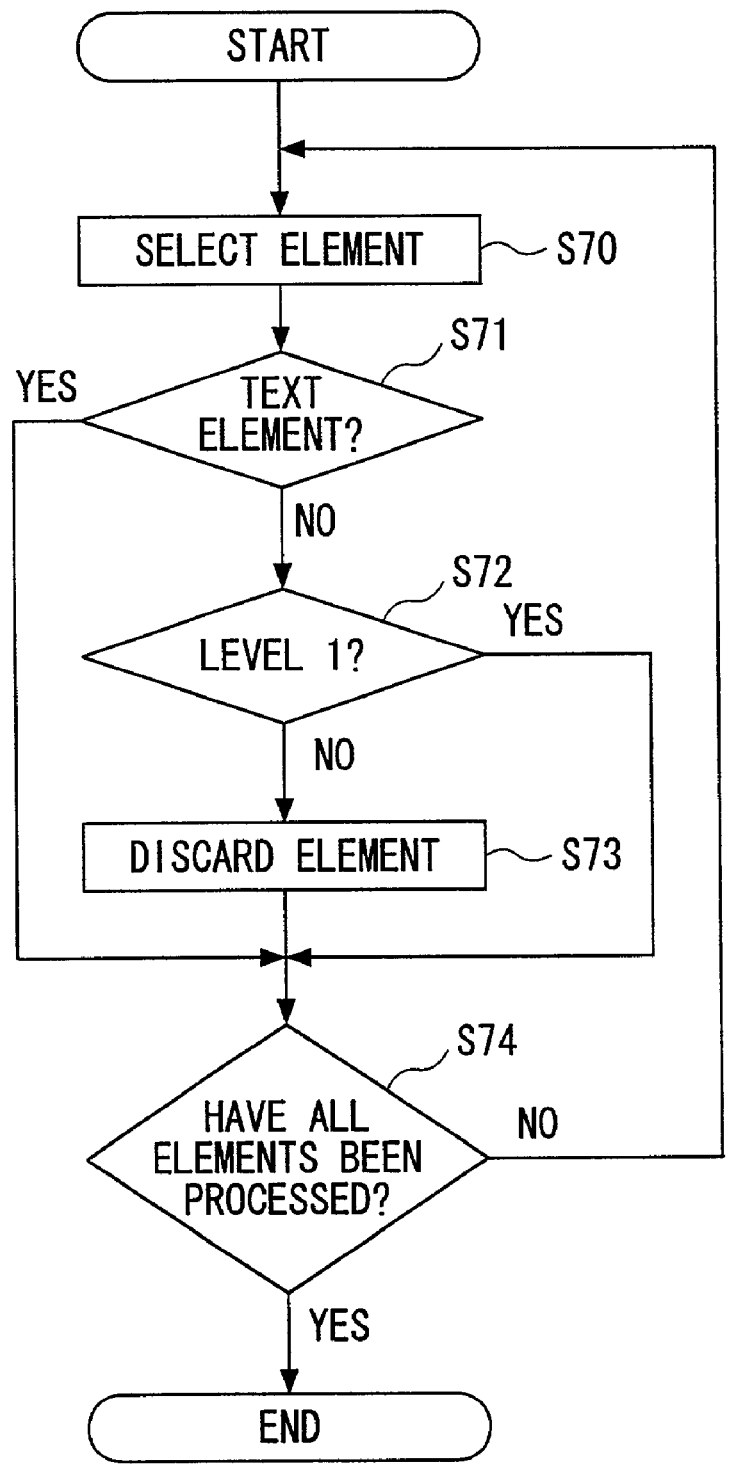
FIG. 17 is a flowchart showing a process carried out by the document-information processing device according to the first embodiment in a process mode B3.

At a step S70 shown in FIG. 17, starting from the root tag "doc", the process unit 103 selects an element one by one from the parse tree shown in FIG. 13, by tracking the parse tree from left to right, and taking a depth of the element as a priority. At a step S71, the process unit 103 checks whether the element selected at the step S70 is a text element. If it is determined at the step S71 that the element selected at the step S70 is the text element, the process unit 103 keeps the element as it is.

On the other hand, if it is determined at the step S71 that the element selected at the step S70 is not the text element or is a non-text element, the process unit 103 proceeds to a step S72, and checks whether a significance level of the element is the level 1. If it is determined at the step S72 that the significance level of the element is the level 1, the process unit 103 keeps the element as it is. On the other hand, if it is determined at the step S72 that the significance level of the element is not the level 1, the process unit 103 discards the element, at a step S73.

The process unit 103 repeats the above-described steps S70 through S73 for all the elements included in the document information. If it is determined at a step S74 that the process unit 103 has processed all the elements included in the document information, the process unit 103 finishes the above-described process in the process mode B3.

As described above, the document-information processing device 100 keeps all the text documents, which are generally significant for understanding contents of document information, regardless of their degrees of significance, in the process mode B3. Additionally, regarding a non-text element such as an image or a sound whose degree of significance is generally lower than that of a text element, the document-information processing device 100 keeps one or a plurality of non-text elements whose significance levels are the level 1, and discards one or a plurality of non-text elements whose significance levels are lower than the level 1, similarly to the process mode B1. Accordingly, the document-information processing device 100 can store as much necessary information as possible for understanding the contents of the document information, and can reduce a total information content of the document information.

Next, a description will be given of a process carried out by the document-information processing device 100 in the process mode B4, with reference to a flowchart shown in FIG. 18. It should be noted that the document information shown in FIG. 4 is inputted as input document information to the document-information processing device 100 in the process mode B4.

Figure 18:
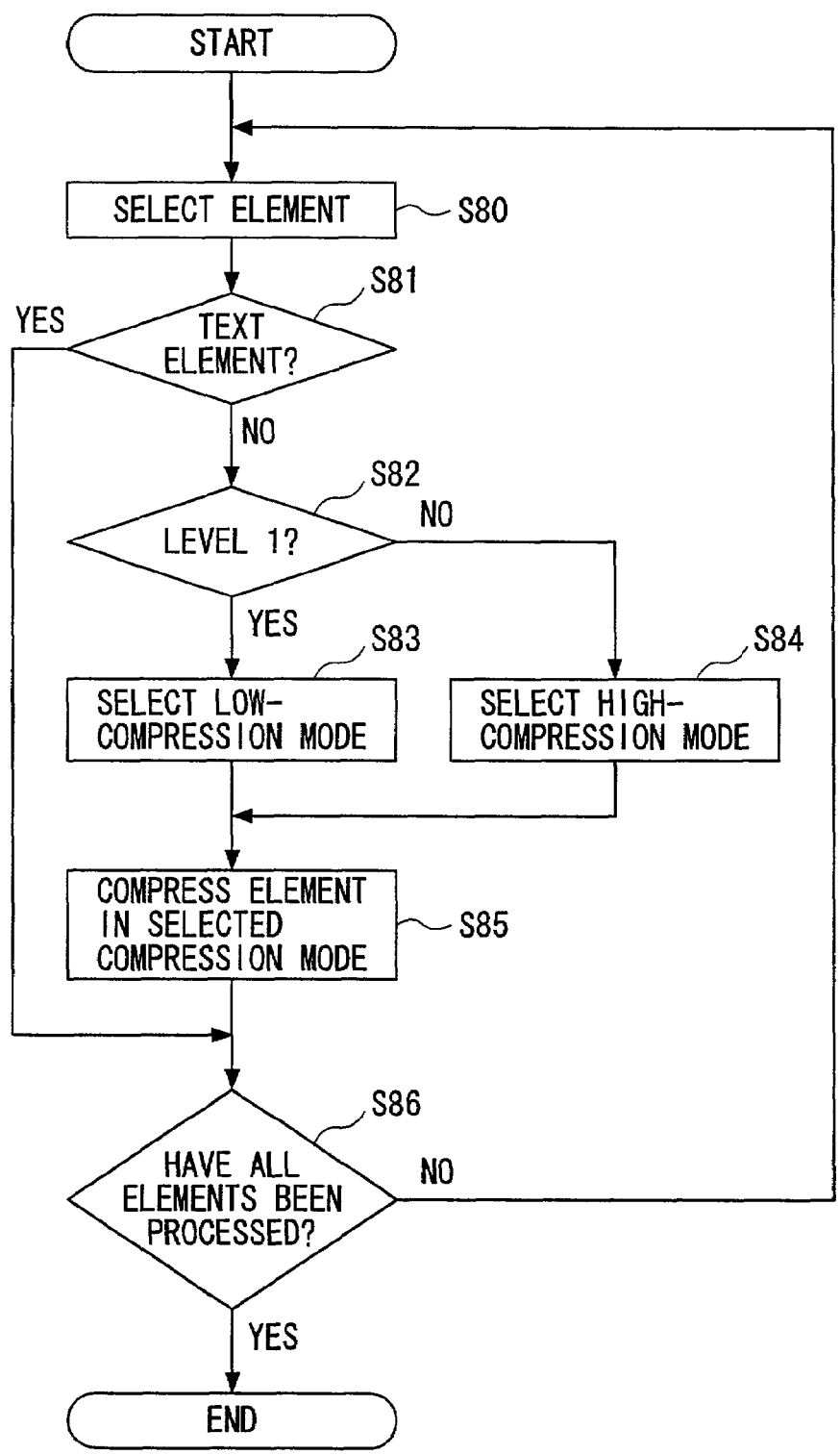
FIG. 18 is a flowchart showing a process carried out by the document-information processing device according to the first embodiment in a process mode B4.

At a step S80 shown in FIG. 18, starting from the root tag "doc", the process unit 103 selects an element one by one from the parse tree shown in FIG. 13, by tracking the parse tree from left to right, and taking a depth of the element as a priority. At a step S81, the process unit 103 checks whether the element selected at the step S80 is a text element. If it is determined at the step S81 that the element selected at the step S80 is the text element, the process unit 103 keeps the element as it is.

On the other hand, if it is determined at the step S81 that the element selected at the step S80 is not the text element or is a non-text element, the process unit 103 proceeds to a step S82, and checks whether a significance level of the element is the level 1. If it is determined at the step S82 that the significance level of the element is the level 1, the process unit 103 selects a low-compression mode, at a step S83. If it is determined at the step S82 that the significance level of the element is not the level 1, and is the level 2 or the level 3, the process unit 103 selects a high-compression mode, at a step S84.

At a step S85 following the steps S83 and S84, the compression unit 104 compresses the element by use of a compression mode selected at the step S83 or S84. The process unit 103 repeats the above-described steps S80 through S85 for each element included in the document information. If it is determined at a step S86 that the process unit 103 has processed all the elements included in the document information, the process unit 103 finishes the above-described process in the process mode B4.

The compression unit 104 compresses an element "imagefile2.gif" of a tag "img2" included in the document information shown in FIG. 4, in the low-compression mode, since a significance level of the element "imagefile2.gif" is the level 1. On the other side, the compression unit 104 compresses an element "imagefile1.gif" of the tag "img1" in the high-compression mode, since a significance level of the element "imagefile1.gif" is the level 3.

The low-compression mode is a compression mode with a low compression rate, in which an effect of reducing an information content of a non-text element is limited, but a decrease in a quality of reproducing the non-text element such as an image is small. On the other hand, the high-compression mode is a compression mode with a high compression rate, in which the information content of the non-text element can be reduced substantially, but a decrease in the quality of reproducing the non-text element is remarkably large.

A single compression method can be used for both of the above-described compression modes. Alternatively, a different compression method can be used for each of the compression modes. For example, the Huffman coding can be used for compressing a static-image element in the low-compression mode. In addition, the discrete cosine transform can be used for compressing the static-image element in the high-compression mode. The document-information processing device 100 may also reduce the information content of the static-image element by adjusting its size, its resolution or its quantization interval, according to a significance level of the static-image element.

Similarly to the process mode B3, the document-information processing device 100 keeps all the text elements that are generally significant for understanding contents of the document information, regardless of their degrees of significance, in the process mode B4. Additionally, regarding a non-text element whose degree of significance is generally lower than a text element, the document-information processing device 100 compresses one or a plurality of non-text elements whose significance levels are the level 1 in the low-compression mode, in which reproduction quality such as image quality or sound quality does not decrease much. On the other hand, the document-information processing device 100 compresses one or a plurality of non-text elements whose significance levels are lower than the level 1 in the high-compression mode, in which a decrease in the reproduction quality is large, and an effect of reducing the information content of the non-text element is large. Accordingly, the document-information processing device 100 can store as much necessary information as possible for understanding the contents of the document information, and can reduce a total information content of the document information.

Figure 19:
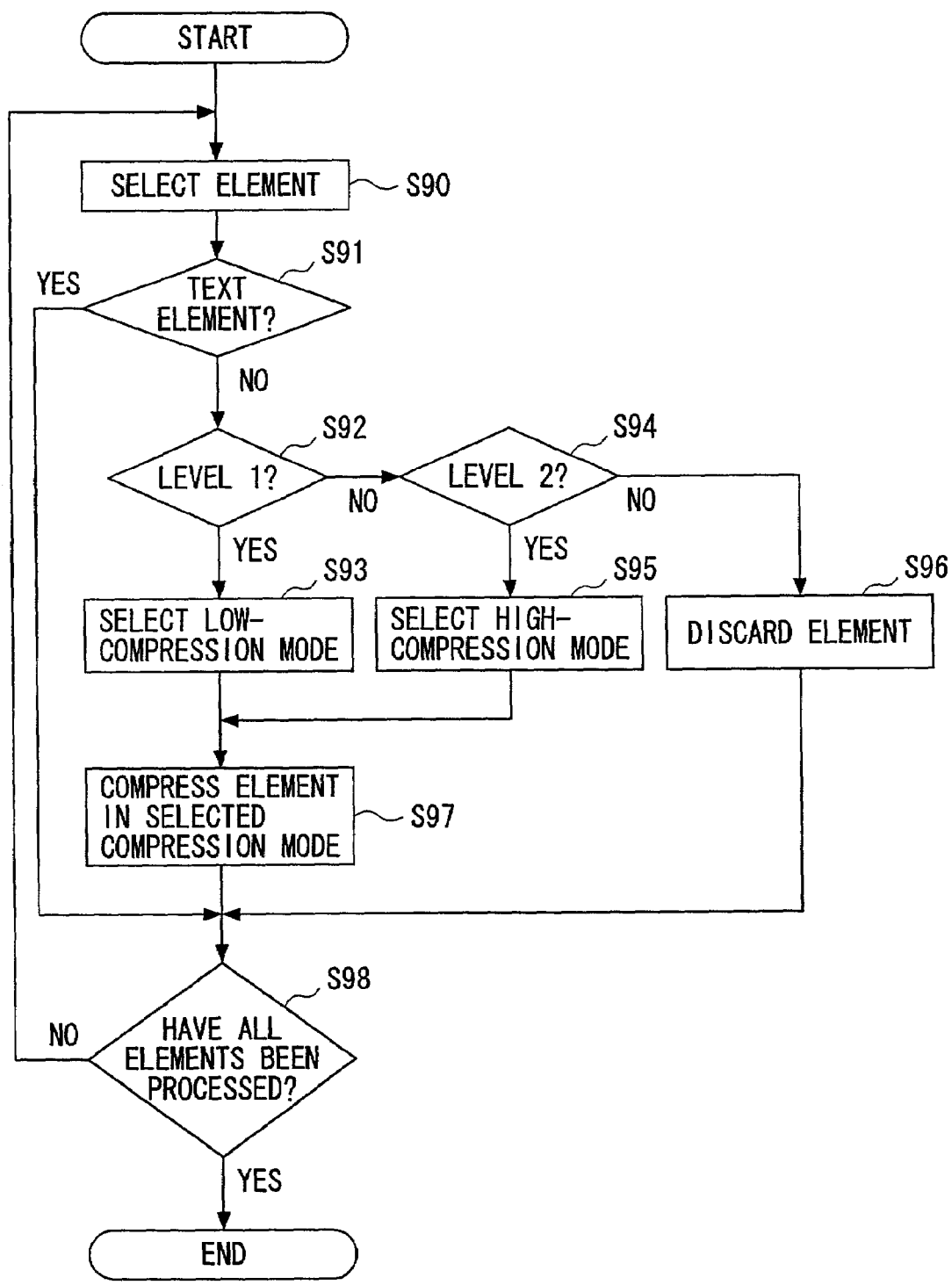
FIG. 19 is a flowchart showing a process carried out by the document-information processing device according to the first embodiment in a process mode B5.

Finally, a description will be given a process carried out by the document-information processing device 100 in the process mode B5, with reference to a flowchart shown in FIG. 19. Steps S90, S91, S92, S93, S95, S97 and S98 shown in FIG. 19 are the same as the steps S80, S81, S82, S83, S84, S85 and S86 shown in FIG. 18, respectively. In addition, FIG. 19 includes steps S94 and S96.

In detail, if it is determined at the step S92 that an element selected at the step S90 is not a level-1 non-text element, the process unit 103 proceeds to the step S94, and checks whether the element is a level-2 non-text element. If it is determined at the step S94 that the element is the level-2 non-text element, the process unit 103 proceeds to the step S95, and compresses the element in the high-compression mode by using the compression unit 104. On the other hand, if it is determined at the step S94 that the element is not the level-2 non-text element, the process unit 103 determines that the element is a level-3 non-text element, and, thus, discards the element, at the step S96.

Additionally, an intermediate compression mode may be provided in addition to the low-compression mode and the high-compression mode. A compression rate of this intermediate compression mode is an intermediate value of the compression ratios of the low-compression mode and the high-compression mode. The process unit 103 may compress an element determined at the step S94 as a level-2 non-text element, in the intermediate compression mode, and may compress an element not determined at the step S94 as the level-2 non-text element, or determined at the step S94 as a level-3 non-text element, in the high-compression mode. A method and an apparatus achieving the above-described compression process are also included in the present invention.

In the above-described embodiments, the document-information processing device 100 evaluates an element by use of three significance levels. However, the document-information processing device 100 may evaluate the element by use of more than three significance levels, and may control operating or processing the element in detail, according to the significance levels.

According to the present invention, the document-information processing device can print or display a document by using an image outputting device such as a printing device or a display device, the document achieving efficient understanding of contents of document information composed of a plurality of elements such as structured document information described in the XML. Alternatively, the document-information processing device can transmit the document to a receiving end by use of an image transmission device such as a FAX, and can record the document at the receiving end.

Additionally, the document-information processing device can reduce the number of print sheets or recording sheets consumed by the image outputting device or the image transmission device, and a transmission time taken by the image transmission device for transmitting the document. In a case in which the document-information processing device is connected to the image outputting device or the image transmission device through a network, the document-information processing device can reduce a time taken for transmitting the document to the image outputting device or the image transmission device.

Additionally, the document-information processing device can store information necessary for understanding the contents of the document information, and can reduce a total information content of the document information. Accordingly, the document-information processing device can reduce a storage capacity necessary for storing the document information. Additionally, in a case in which a storage device for storing the document information is connected to the document-information processing device through a network, the document-information processing device can reduce a transmission time for transmitting the document information to the storage device. Additionally, the document-information processing device can achieve understanding of the contents of the document information without difficulty by printing or displaying the document information stored in the storage device, and can achieve efficient understanding of the contents since one or a plurality of elements having low degrees of significance are eliminated from the original document information. Further, such a document-information processing device can be easily achieved by use of a general computer.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-214394, filed on Jul. 14, 2000, the entire contents of which are hereby incorporated by reference.

What is claimed is:

1. A recording medium readable by a computer, tangibly embodying a program of instructions executable by the computer to generate an output document from structured-document information, said program comprising the steps of:
inputting document informatiion from a document information source, said document information being composed of a plurality of elements described in XML;
evaluating a degree of significance of each element composing said input document information;
selecting in succession an element among said plurality of elements composing said input document information in a decreasing significance order based on a result of the evaluating step;
generating the output document in which the selected elements are placed in a selecting order in the selecting step; and
outputting the generated output document on a printing device, a display device or an image transmission device,
wherein the evaluating step includes the steps of:
reading an XML declaration block of the input document information and determining whether the XML declaration block read is an XML declaration;
reading a document-type declaration and a document entity of the input document information if it is determined that the input document information is XML document information;
separating a tag and an element described in the document entity be using a regulation set in the document-type declaration;
converting the document entity to a tree structure; and
adding the evaluated degree of significance of said each element to said tree structure.

2. A method of generating an output document from structured-document information, said method comprising the steps of:
inputting document information from a document information source, said document information being composed of a plurality of element described in XML;
evaluating a degree of significance of each element composing said input document information;
selecting in succession an element among said plurality of elements composing said input document information in a decreasing significance order based on a result of the evaluating step;
generating the output document in which the selected elements are placed in a selecting order in the selecting step; and
outputting the generated output document on a printing device, a display device, or an image transmission device;
wherein in the evaluating step includes the steps of
reading an XML declaration block of the input document information and determining whether the XML declaration block read is an XML declaration;
reading a document-type declaration and a document entity of the input document information if it is determined that the input document information is XML document information;
separating a tag and an element described in the document entity by using a regulation set in the document-type declaration;
converting the document entity to a tree structure; and
adding the evaluated degree of significance of said each element to said tree structure.

3. The method as claimed in claim 2, wherein said evaluating step includes a step of evaluating a degree of significance of each element based on a fixed significance-evaluating standard.

4. The method as claimed in claim 2, wherein said step of generating the output document includes a step of limiting the element to be placed on said output document, based on a predetermined page size and a predetermined number of pages of said output document.

5. The method as claimed in claim 4, wherein said limiting step includes a step of limiting the element to be placed on said output document so that a total space occupied by one or a plurality of selected elements on said output documents is less than or equal to a space limit determined by the page size and the number of pages.

6. The method as claimed in claim 5, wherein said limiting step includes a step of continuing selecting the element until said total space exceeds said space limit; and eliminating a most-recently selected element from said output document.

7. The method as claimed in claim 5, wherein said limiting step includes a step of continuing selecting the element until said total space exceeds said space limit; reducing a size of at least a part of said one or said plurality of selected elements so that said total space becomes less than or equal to said space limit; and placing said one or said plurality of selected elements on said output document.

8. The method as claimed in claim 2, wherein said step of generating the output document includes a step of eliminating an element whose degree of significance is lower than a specific significance level.

9. The method as claimed in claim 8, wherein said specific significance level differs with an attribute of said each element.

10. The method as claimed in claim 9, wherein the specific significance level of a non-text element is higher than that of a text element.

11. The method as claimed in claim 2, wherein said step of generating the output document includes steps of keeping a text element; and eliminating a non-text element.

12. The method as claimed in claim 2, wherein said step of generating the output document includes as step of compressing a non-text element by using a compression method corresponding to the degree of significance of said non-text element.

13. The method of claimed in claim 2, wherein said step of generating the output document includes a step of compressing a non-text element at a compression rate corresponding to the degree of significance of said non-text element.

14. The method as claimed in claim 2, wherein said step of generating the output document includes a step of eliminating a text element whose degree of significance is lower than a first significance level; and compressing a non-text element whose degree of significance is lower than a second significance level.

15. A document-information processing device, comprising:
   an input unit configured to input document information from a document information source, said document information being composed of a plurality of elements described in XML;
   an evaluation unit configured to evaluate a degree of significance of each element composing said input document information;
   a process unit configured to select an element among said plurality of elements composing said input document information in a decreasing significance order based on an evaluation result of the evaluation unit, the process unit generating the output document in which the selected elements are placed in a selecting order; and
   an output unit configured to output the generated output document on a printing device, a display device or an image transmission device,
   wherein in the evaluation unit includes:
      a exterminating unit configured to read an XML declaration block of the input document information and determine whether the XML declaration block read is an XML declaration;
      a reading unit configured to read a document-type declaration and a document entity of the input document information if it is determined that the input document information is XML document information;
      a separating unit configured to separate a tag and an element described in the document entity by using a regulation set in the document-type declaration;
      a converting unit configured to convert the document entity to a tree structure; and
      an adding unit configured to add the evaluated degree of significance of said each element to said tree structure.

16. The document-information processing device as claimed in claim 15, wherein said evaluation unit evaluates a degree of significance of each element based on a fixed significance-evaluating standard.

17. The document-information processing device as claimed in claim 15, wherein said process unit limits the element to be placed on said output document, based on a predetermined page size and a predetermined number of pages of said output document.

18. The document-information processing device as claimed in claim 17, wherein said process unit limits the element to be placed on said output document so that a total space occupied by one or a plurality of selected elements on said output document is less than or equal to a space limit determined by the page size and the number of pages.

19. The document-information processing device as claimed in claim 18, wherein said process unit continues selecting the element until said total space exceeds said space limit; and eliminating a most-recently selected element from said output document.

20. The document-information processing device as claimed in claim 18, wherein said process unit continues selecting the element until said total space exceeds said space limit; reducing a size of at least a part of said one or said plurality of selected elements so that said total space becomes less than or equal to said space limit; and placing said one or said plurality of selected elements on said output document.

21. The document-information processing device as claimed in claim 15, wherein said process unit eliminates an element whose degree of significance is lower than a specific significance level.

22. The document-information processing device as claimed in claim 21, wherein said specific significance level differs with an attribute of said each element.

23. The document-information processing device as claimed in claim 21, wherein the specific significance level of a non-text element is higher than that of a text element.

24. The document-information processing device as claimed in claim 15, wherein said process unit keeps a text element and eliminates a non-text element.

25. The document-information processing device as claimed in claim 15, wherein said process unit compresses a non-text element by using a compression method corresponding to the degree of significance of said non-text element.

26. The document-information processing device as claimed in claim 15, wherein said process unit compresses a non-text element at a compression rate corresponding to the degree of significance of said non-text element.

27. The document-information processing device as claimed in claim 15, wherein said process unit eliminates a text element whose degree of significance is lower than a first significance level; and compressing a non-text element whose degree of significance is lower than a second significance level.

28. The document-information processing device as claimed in claim 15, wherein said process unit compresses the elements with a compression rate varied according to a selected process mode.

* * * * *